US011696114B2

(12) United States Patent
Prakasam et al.

(10) Patent No.: US 11,696,114 B2
(45) Date of Patent: Jul. 4, 2023

(54) STEERING OF ROAMING PLMN LIST UPDATE AND MANAGEMENT

(71) Applicant: Apple Inc., Cupertino, CA (US)

(72) Inventors: Sridhar Prakasam, Fremont, CA (US); Qi He, San Jose, CA (US); Rohit Matolia, Surat (IN); Shashanka Totadamane Ramappa, Bengaluru (IN); Nirlesh Koshta, Karntaka (IN); Xiangpeng Jing, Palo Alto, CA (US); Krisztian Kiss, Hayward, CA (US); Nitin Kuppelur, Bangalore (IN); Kavya Ravikumar, San Diego, CA (US); Rajkumar Krishnaperumal, Bangalore (IN); Pradeep Pangi, Bengaluru (IN); Karthik Anantharaman, Cupertino, CA (US); Alosious Pradeep Prabhakar, Singapore (SG); Vijay Venkataraman, San Jose, CA (US); Lester Chan, Cupertino, CA (US); Madhusudhan Cheripally, Bengaluru (IN)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 17/393,063

(22) Filed: Aug. 3, 2021

(65) Prior Publication Data

US 2022/0053313 A1 Feb. 17, 2022

(30) Foreign Application Priority Data

Aug. 12, 2020 (IN) .............................. 202041034686

(51) Int. Cl.
*H04W 8/12* (2009.01)
*H04W 8/28* (2009.01)
(Continued)

(52) U.S. Cl.
CPC ............... *H04W 8/12* (2013.01); *H04W 8/20* (2013.01); *H04W 8/28* (2013.01); *H04W 84/042* (2013.01)

(58) Field of Classification Search
CPC ........... H04W 8/12; H04W 8/20; H04W 8/28; H04W 84/042; H04W 48/12
See application file for complete search history.

(56) References Cited

U.S. PATENT DOCUMENTS

2017/0346746 A1* 11/2017 Zhang ..................... H04L 47/24
2020/0344606 A1* 10/2020 Zaus .................... H04W 84/042
2021/0281995 A1*  9/2021 Kumar ..................... H04W 8/12

FOREIGN PATENT DOCUMENTS

EP    1819184 A1    8/2007
EP    2268085 A1   12/2010
(Continued)

OTHER PUBLICATIONS

Extended European Search Report for EP Patent Application No. 21190507.0; 10 pages; dated Jan. 17, 2022.
(Continued)

*Primary Examiner* — Jianye Wu
(74) *Attorney, Agent, or Firm* — Kowert, Hood, Munyon, Rankin & Goetzel, P.C.

(57) ABSTRACT

Apparatuses, systems, and methods for SoR list management and PLMN selection based on an SoR list. A UE may receive an SoR container which may include a list of OPLMNs. The UE may store a prior list of OPLMNs stored on a USIM of the UE on a memory of the UE. The UE replace the prior list of OPLMNs stored on the USIM with the list of OPLMNs included in the SoR container. The UE may consider the prior list of OPLMNs as a lower priority list as compared to the list of OPLMNs stored on the USIM. Additionally, in response to determining to move from a
(Continued)

current PLMN, the UE may scan for a new PLMN based on the list of OPLMNs stored on the USIM.

20 Claims, 20 Drawing Sheets

(51) Int. Cl.
   *H04W 8/20* (2009.01)
   *H04W 84/04* (2009.01)

(56) References Cited

FOREIGN PATENT DOCUMENTS

| | | | |
|---|---|---|---|
| EP | 3113545 | A1 | 1/2017 |
| WO | 2015143698 | A1 | 10/2015 |
| WO | 2020050700 | A1 | 3/2020 |

OTHER PUBLICATIONS

"Digital cellular telecommunications system (Phase 2+) (GSM); UMTS; LTE; 5G; Non-Access-Stratum (NAS) functions related to Mobile Station (MS) in idle mode (3GPP TS 23.122 version 16.6.1 Release 16)"; vol. 3GPP TS 23.122 16.6.1 Release 16), pp. 1-83; Jul. 24, 2020.

"3rd Generation Partnership Project; Technical Specification Group Radio Access Network; 5GS; User Equipment (UE) conformance specification; Part 1: Protocol (Release 16)", 3GPP TS 38.523-1 V16.1.0, Sophia-Antipolis Cedex, France; 337 pages; Jul. 8, 2020.

Office Action for Indian Patent Application No. 202041034686; 6 pages; dated Mar. 24, 2022.

* cited by examiner

STEERING OF ROAMING PLMN LIST UPDATE AND MANAGEMENT

PRIORITY DATA

This application claims benefit of priority to Indian Patent Application Number 202041034686, titled "Steering of Roaming PLMN List Update and Management", filed Aug. 12, 2020, which is hereby incorporated by reference in its entirety as though fully and completely set forth herein.

FIELD

The invention relates to wireless communications, and more particularly to apparatuses, systems, and methods for updating PLMNs included in an SoR list, e.g., a list of prioritized operator controlled PLMNs stored on a wireless device.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR may provide a higher capacity for a higher density of mobile broadband users, also supporting device-to-device, ultra-reliable, and massive machine type communications with lower latency and/or lower battery consumption. Further, the 5G-NR may allow for more flexible UE scheduling as compared to current LTE. Consequently, efforts are being made in ongoing developments of 5G-NR to take advantage of higher throughputs possible at higher frequencies.

SUMMARY

Embodiments relate to wireless communications, and more particularly to apparatuses, systems, and methods for updating PLMNs included in an SoR list, e.g., a list of prioritized operator controlled PLMNs stored on a wireless device.

For example, in some embodiments, a user equipment device (UE) may be configured to receive, from a network (e.g., from a network entity such as a base station), a steering of roaming (SoR) container. The SoR container may include a list of operator preferred public land mobile networks (OPLMNs). The UE may be configured to store a prior (and/or current) list of OPLMNs stored on a universal subscriber identity module (USIM) of the UE on a memory of the UE. In other words, the UE may copy a list of OPLMNs (e.g., an SoR list) stored on the USIM to another memory location on the UE. Additionally, the UE may be configured to replace the prior (and/or current) list of OPLMNs stored on the USIM with the list of OPLMNs included in the SoR container. In some embodiments, the UE may treat (e.g., consider) the prior list of OPLMNs (e.g., the list of OPLMNs stored in the memory of the UE) as a lower priority list as compared to the list of OPLMNs stored on the USIM. For example, in some embodiments, in response to determining to move from a current public land mobile network (PLMN), the UE may scan (and/or search) for a new PLMN based on the list of OPLMNs stored on the USIM. Additionally, in response to not discovering a PLMN corresponding to an OPLMN in the list of OPLMNs stored on the USIM, the UE may scan (and/or search) for a new PLMN based on the list of OPLMNs stored in the memory of the UE.

As another example, in some embodiments, a UE may be configured to receive, from a network (e.g., from a network entity, such as base station), an SoR container that may include a list of OPLMNs and the OPLMNs within the list of OPLMNs are associated with a plurality of mobile country codes (MCCs). The UE may be configured to compare the list of OPLMNs included in the SoR container to the prior list of OPLMNs. For example, the UE may compare MCCs associated with the list of OPLMNs included in the SoR container to MCCs associated with the prior list of OPLMNs. Further, the UE may be configured to replace OPLMNs in the prior list of OPLMNs that have an MCC corresponding to an MCC of the plurality of MCCs included in the list of OPLMNs. Additionally, the UE may keep OPLMNs in the prior list of OPLMNs that do not have an MCC corresponding to an MCC of the plurality of MCCs included in the list of OPLMNs.

As a further example, a UE may be camping on a cell of a visited PLMN (VPLMN) and may lose a signal to the cell (e.g., the serving cell) on VPLMN. In such instances, the UE may be configured to consider PLMNs in an SoR aborted list as a lower priority than PLMNs stored in the USIM. In some embodiments, the SoR aborted list may be a "PLMNs where registration was aborted due to SoR list."

As yet another example, a UE may be configured to perform a high priority PLMN selection in which the UE has PLMNs where registration was aborted due to an SoR list (e.g., a "PLMNs where registration was aborted due to SoR list"). Further, the UE may be configured to consider, during the high priority PLMN selection, equivalent PLMNs (ePLMNs) in a "PLMNs where registration was aborted due to SoR list" as lower priority than ePLMNs associated with an MCC equivalent to an MCC of a current serving vPLMN.

As an example, a UE may be configured to add a current PLMN to an SoR aborted list (e.g., a "PLMNs where registration was aborted due to SoR list"). Additionally, the UE may, in response to adding the current PLMN to the SoR aborted list, not consider ePLMNs as a lowest priority PLMN based, at least in part, on adding the current PLMN to the SoR aborted list.

As yet a further example, a UE may be configured to receive an SoR container while in a manual mode of operation and/or while on a user controlled PLMN (UPLMN). In such instances, the UE may be configured to remain on a current VPLMN.

As a further example, a UE may be configured to determine that the UE does not have an OPLMN list and/or has an OPLMN list with no matching VPLMNs in a current country (e.g., based on an MCC of the current country). In such embodiments, in response to determining that the UE does not have an OPLMN list and/or has an OPLMN list with no matching VPLMNs in a current country, the UE may be configured to continue to search for random PLMNs to receive an SoR container.

As another further example, a UE may be configured to store, while in a manual mode of operation, a PLMN identity in an SoR aborted list (e.g., a "PLMNs where registration was aborted due to SoR list"). In such embodiments, in response to storing the PLMN identity in the SoR aborted list, the UE may attempt to obtain service on a higher priority PLMN. Additionally, the UE may act (e.g., perform) as if a timer that controls periodic registration attempts has expired and may send a registration complete message to a serving core access and mobility management function (AMF), e.g., such as AMF 704, of the network.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
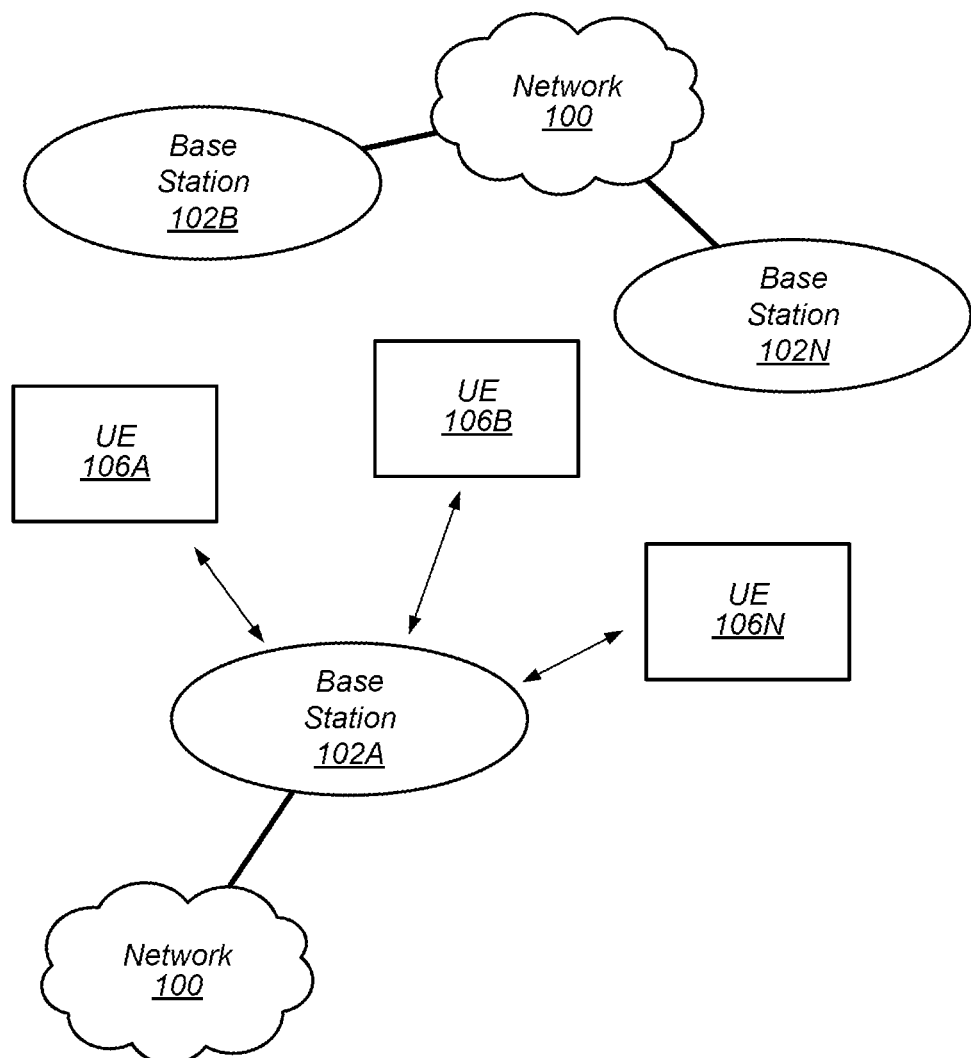
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
  3GPP: Third Generation Partnership Project
  UE: User Equipment
  RF: Radio Frequency
  BS: Base Station
  DL: Downlink
  UL: Uplink
  LTE: Long Term Evolution
  NR: New Radio
  5GS: 5G System
  5GMM: 5GS Mobility Management
  5GC/5GCN: 5G Core Network
  IE: Information Element
  CE: Control Element
  MAC: Medium Access Control
  SSB: Synchronization Signal Block
  CSI-RS: Channel State Information Reference Signal
  PDCCH: Physical Downlink Control Channel
  PDSCH: Physical Downlink Shared Channel
  RRC: Radio Resource Control
  RRM: Radio Resource Management
  CORESET: Control Resource Set
  TCI: Transmission Configuration Indicator
  DCI: Downlink Control Indicator Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
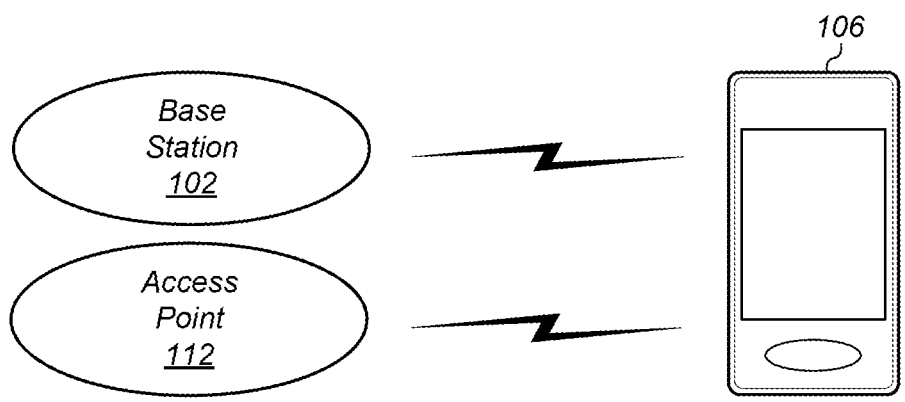
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
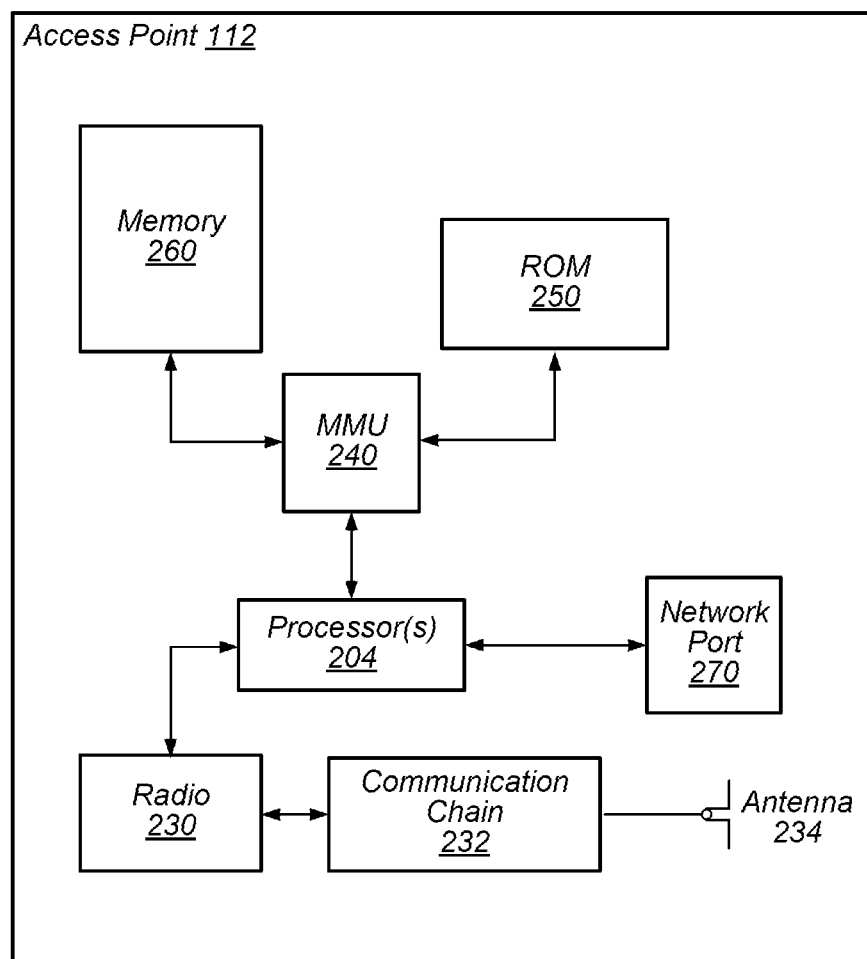
FIG. 2 illustrates an example simplified block diagram of a WLAN Access Point (AP), according to some embodiments.

FIG. 2: Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for updating PLMNs included in an SoR list, e.g., a list of prioritized operator controlled PLMNs stored on a wireless device as further described herein.

Figure 3:
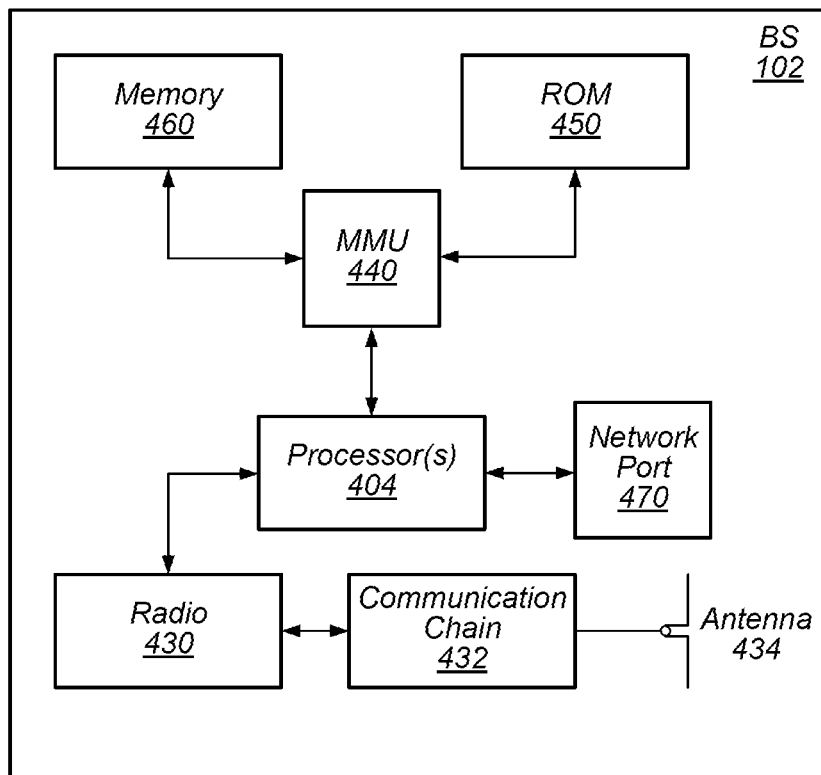
FIG. 3 illustrates an example block diagram of a BS according to some embodiments.

FIG. 3: Block Diagram of a Base Station

FIG. 3 illustrates an example block diagram of a base station 102, according to some embodiments. It is noted that the base station of FIG. 3 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 4:
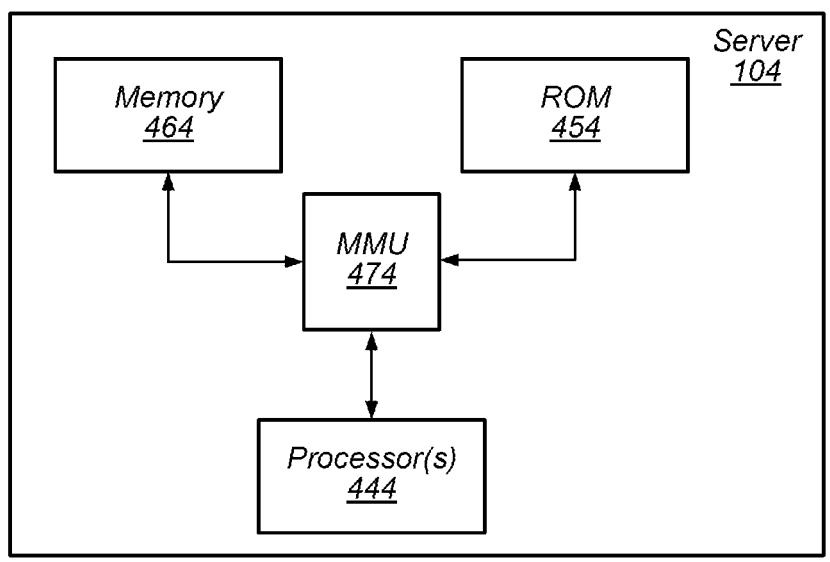
FIG. 4 illustrates an example block diagram of a server according to some embodiments.

FIG. 4: Block Diagram of a Server

FIG. 4 illustrates an example block diagram of a server 104, according to some embodiments. It is noted that the base station of FIG. 4 is merely one example of a possible server. As shown, the server 104 may include processor(s) 444 which may execute program instructions for the server 104. The processor(s) 444 may also be coupled to memory management unit (MMU) 474, which may be configured to receive addresses from the processor(s) 444 and translate those addresses to locations in memory (e.g., memory 464 and read only memory (ROM) 454) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 444 of the server 104 may be configured to implement or support implementation of part or all of the methods described herein, e.g., by executing program instructions stored on a memory medium (e.g., a non-transitory computer-readable memory medium). Alternatively, the processor 444 may be configured as a programmable hardware element, such as an FPGA (Field Programmable Gate Array), or as an ASIC (Application Specific Integrated Circuit), or a combination thereof. Alternatively (or in addition) the processor 444 of the server 104, in conjunction with one or more of the other components 454, 464, and/or 474 may be configured to implement or support implementation of part or all of the features described herein.

In addition, as described herein, processor(s) 444 may be comprised of one or more processing elements. In other words, one or more processing elements may be included in processor(s) 444. Thus, processor(s) 444 may include one or more integrated circuits (ICs) that are configured to perform the functions of processor(s) 444. In addition, each integrated circuit may include circuitry (e.g., first circuitry, second circuitry, etc.) configured to perform the functions of processor(s) 444.

Figure 5A:
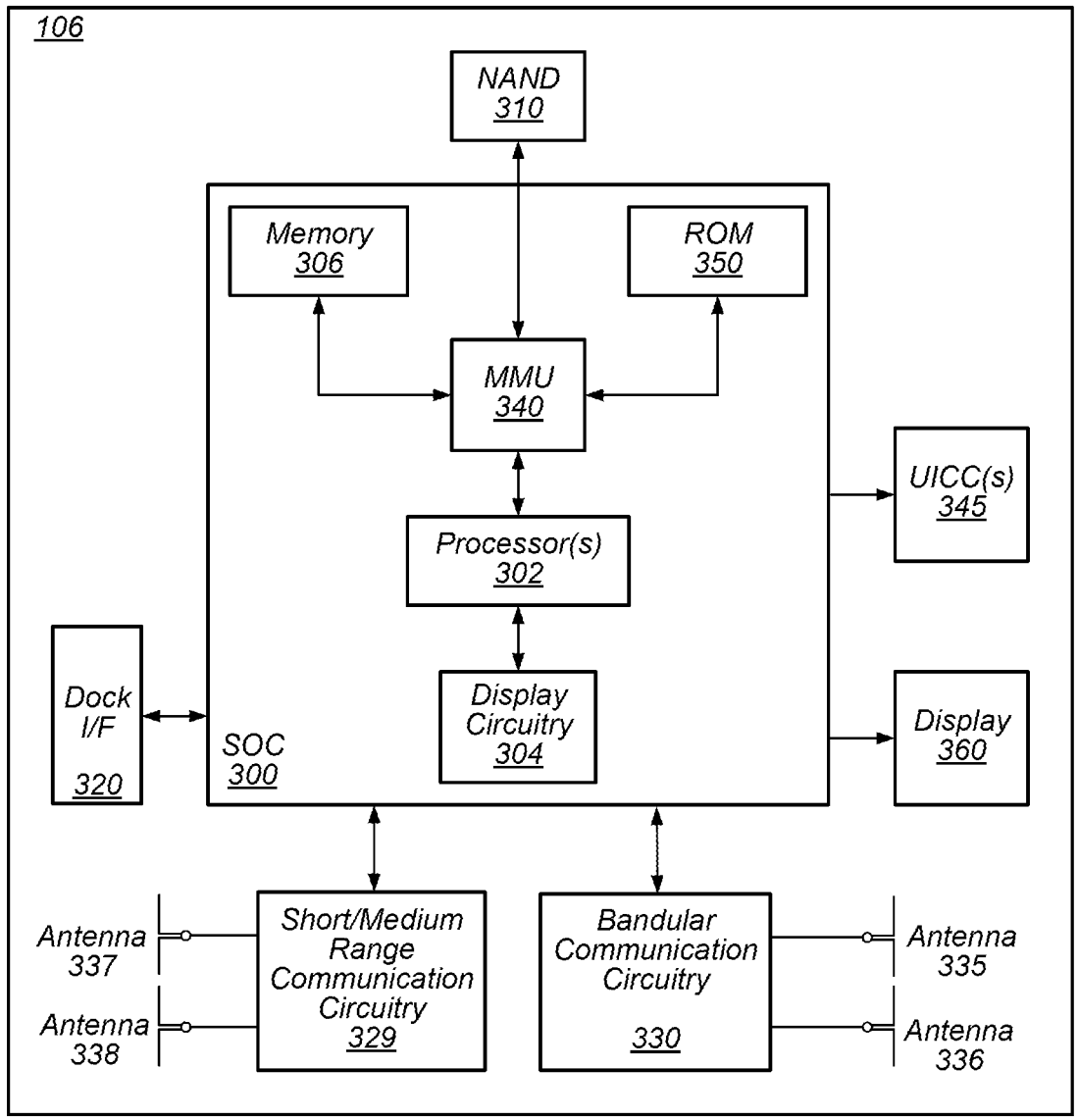
FIG. 5A illustrates an example block diagram of a UE according to some embodiments.

FIG. 5A: Block Diagram of a UE

FIG. 5A illustrates an example simplified block diagram of a communication device 106, according to some embodiments. It is noted that the block diagram of the communication device of FIG. 5A is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 310 may be implemented as a removable smart card. Thus the SIM(s) may be one or more removable smart cards (such as UICC cards, which are sometimes referred to as "SIM cards"), and/or the SIMS 310 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMS, two removable SIMs, or a combination of one embedded SIMs and one removable SIMS. Various other SIM configurations are also contemplated.

As noted above, in some embodiments, the UE 106 may include two or more SIMs. The inclusion of two or more SIMS in the UE 106 may allow the UE 106 to support two different telephone numbers and may allow the UE 106 to communicate on corresponding two or more respective networks. For example, a first SIM may support a first RAT such as LTE, and a second SIM 310 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMS in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for updating PLMNs included in an SoR list, e.g., a list of prioritized operator controlled PLMNs stored on a wireless device as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 5B:
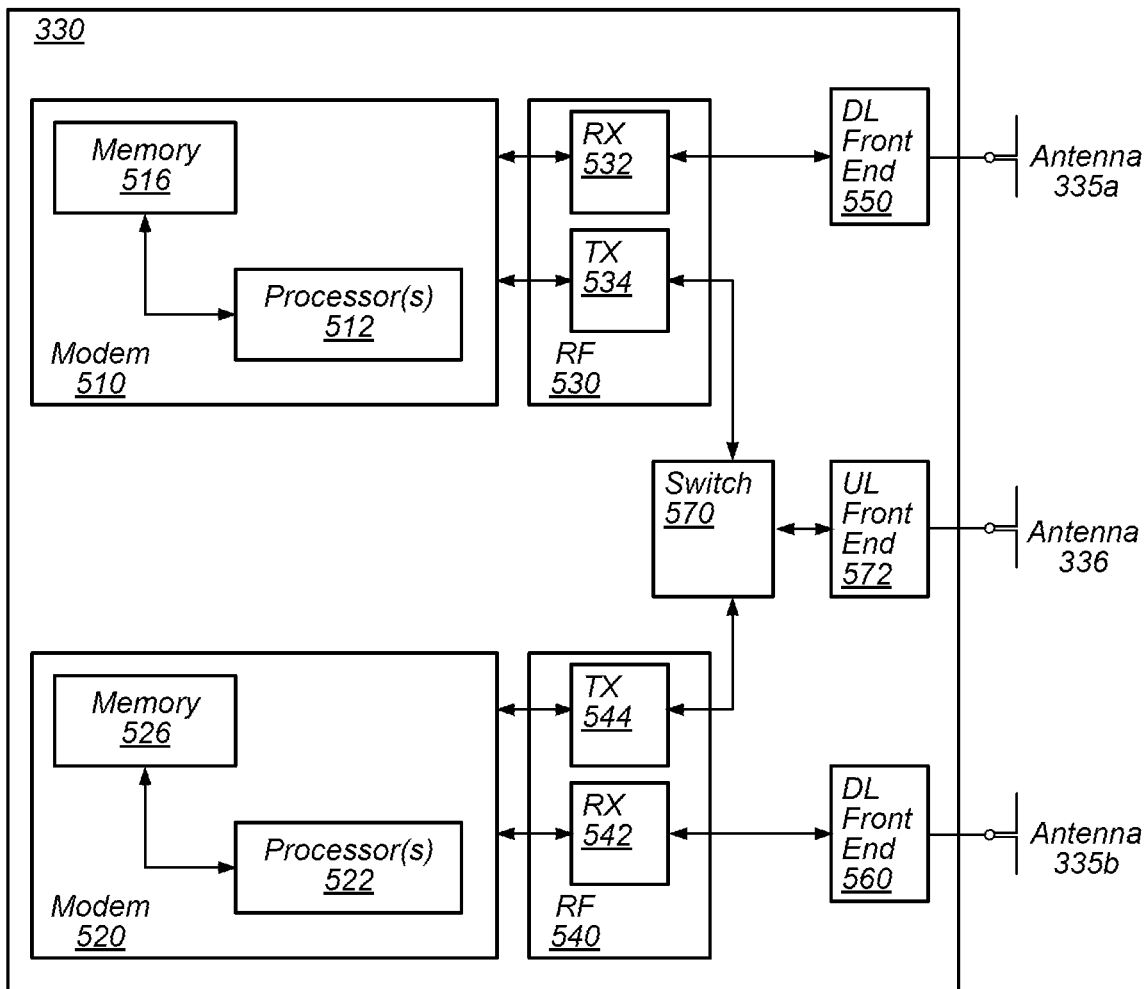
FIG. 5B illustrates an example block diagram of cellular communication circuitry, according to some embodiments.

FIG. 5B: Block Diagram of Cellular Communication Circuitry

FIG. 5B illustrates an example simplified block diagram of cellular communication circuitry, according to some embodiments. It is noted that the block diagram of the cellular communication circuitry of FIG. 5B is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods updating PLMNs included in an SoR list, e.g., a list of prioritized operator controlled PLMNs stored on a wireless device as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
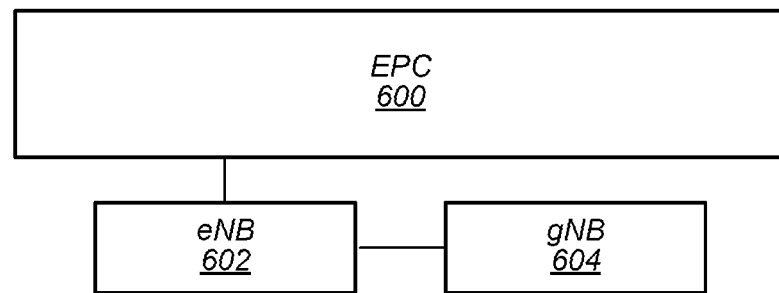
FIG. 6A illustrates an example of connections between an EPC network, an LTE base station (eNB), and a 5G NR base station (gNB).
Figure 6B:
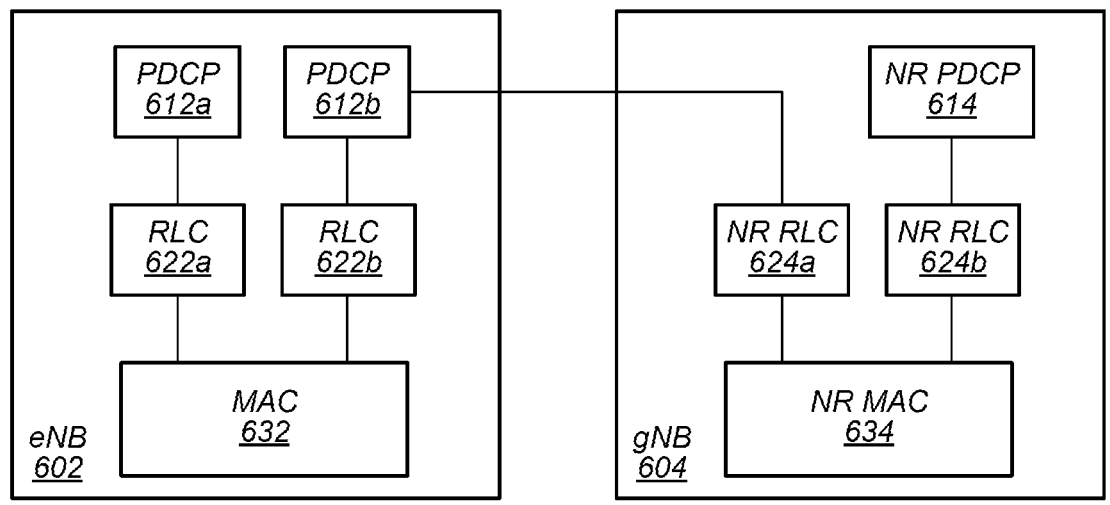
FIG. 6B illustrates an example of a protocol stack for an eNB and a gNB.

FIGS. 6A and 6B: 5G NR Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Figure 7A:
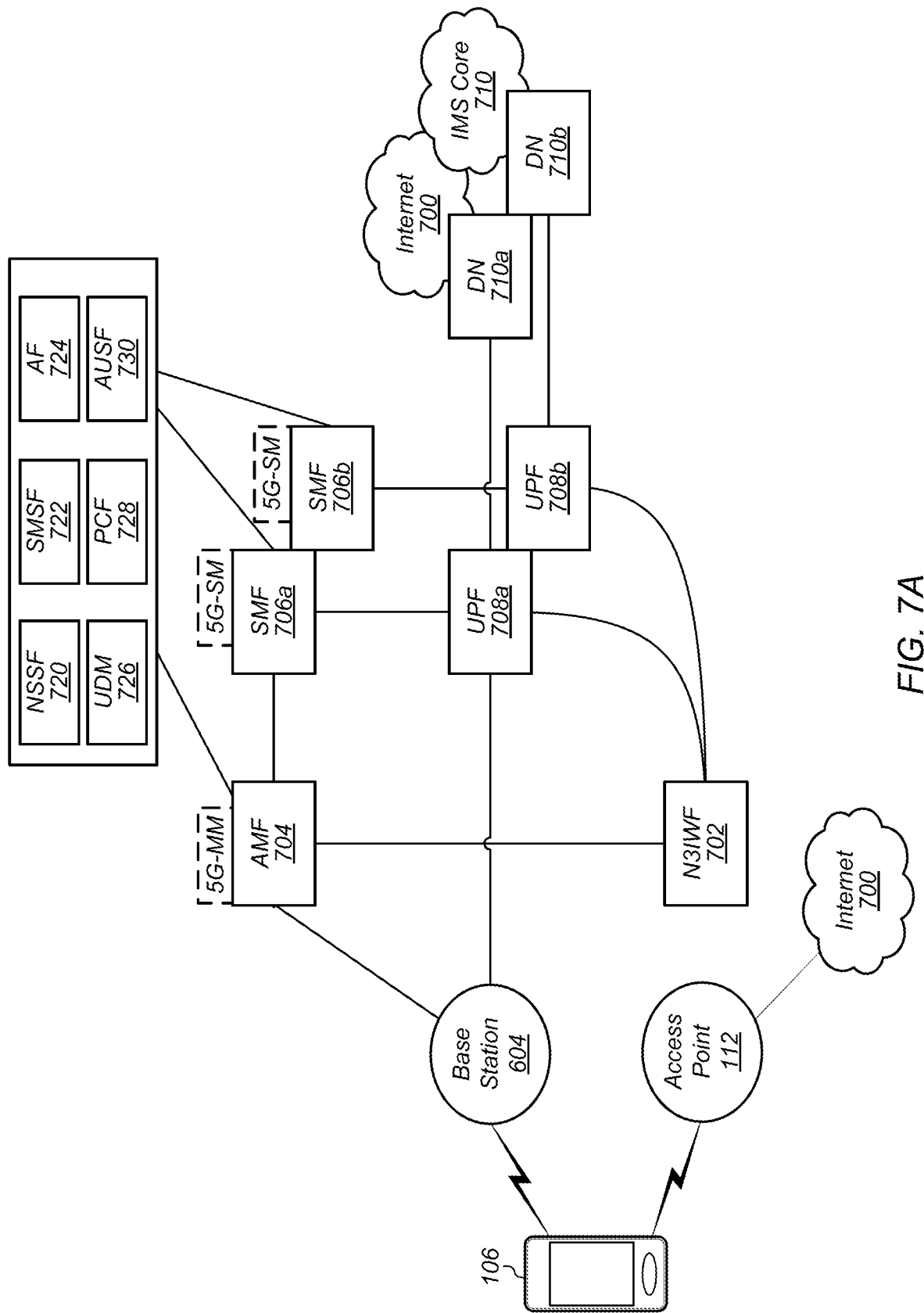
FIG. 7A illustrates an example of a 5G network architecture that incorporates both 3GPP (e.g., cellular) and non-3GPP (e.g., non-cellular) access to the 5G CN, according to some embodiments.
Figure 7B:
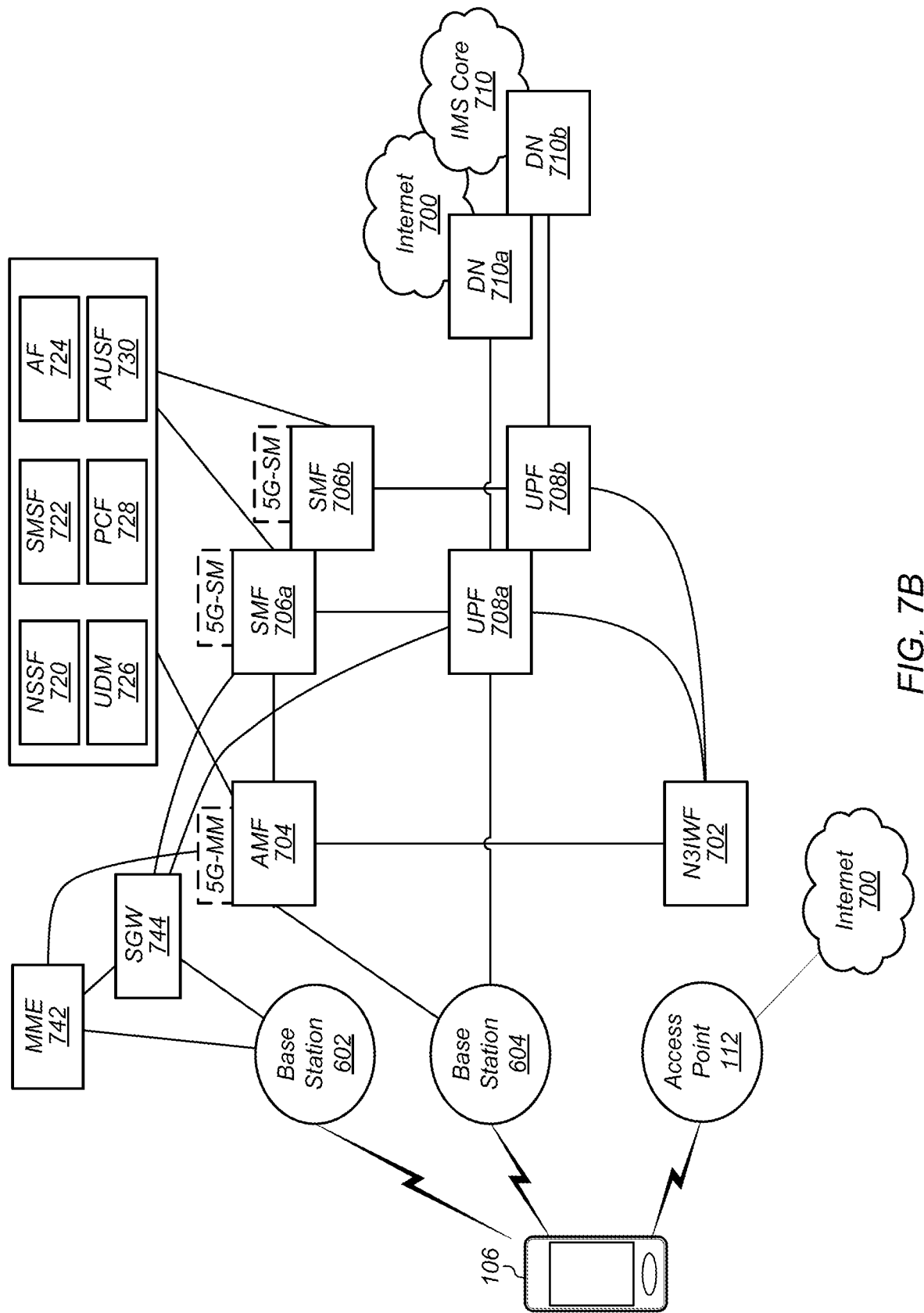
FIG. 7B illustrates an example of a 5G network architecture that incorporates both dual 3GPP (e.g., LTE and 5G NR) access and non-3GPP access to the 5G CN, according to some embodiments.
Figure 8:
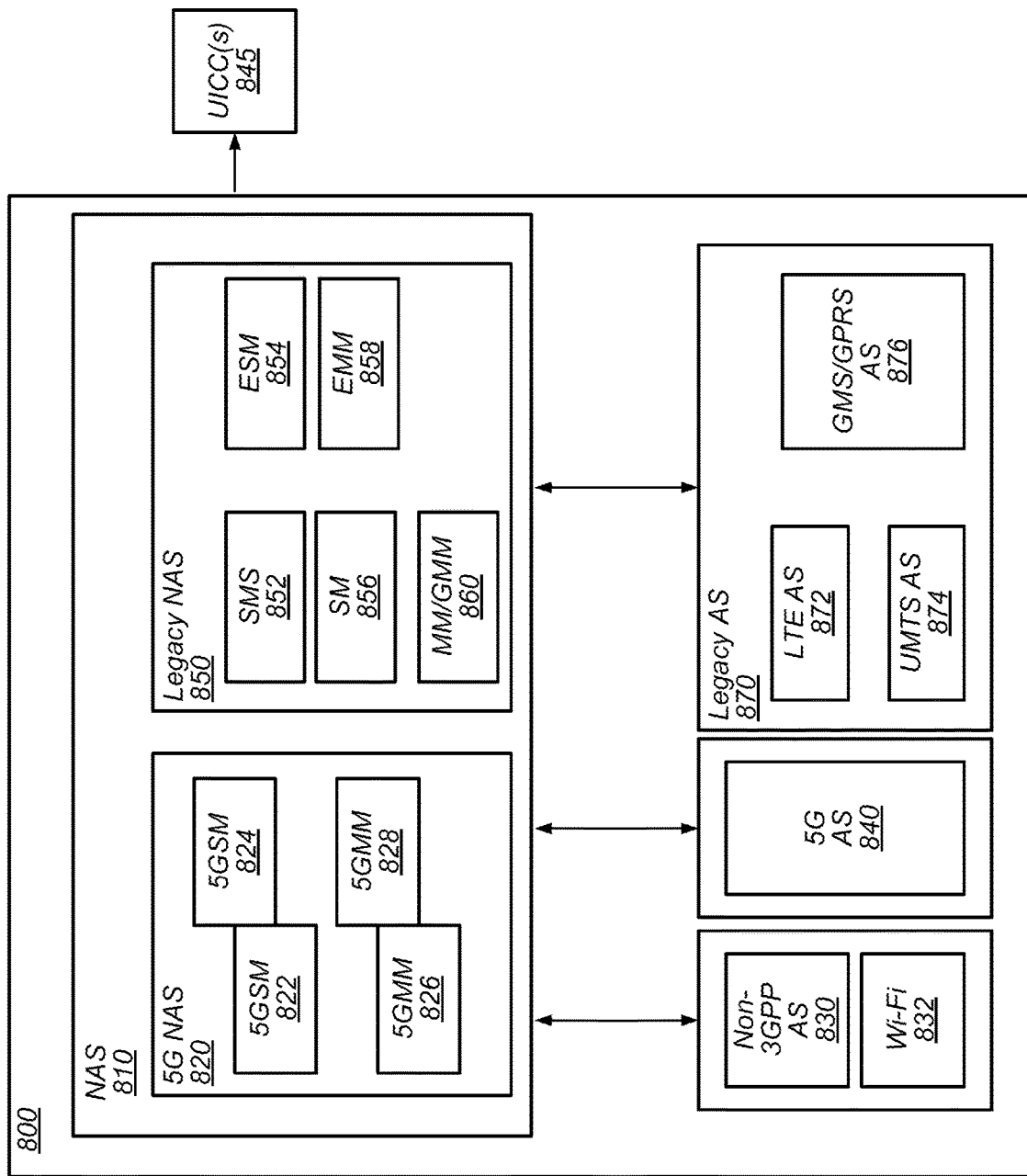
FIG. 8 illustrates an example of a baseband processor architecture for a UE, according to some embodiments.

FIGS. 7A, 7B and 8: 5G Core Network Architecture-Interworking with Wi-Fi In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and Internet Protocol (IP) Multimedia Subsystem/IP Multimedia Core Network Subsystem (IMS) core network 710.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to improve security checks in a 5G NR network, including mechanisms updating PLMNs included in an SoR list, e.g., a list of prioritized operator controlled PLMNs stored on a wireless device, e.g., as further described herein.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS)

entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods updating PLMNs included in an SoR list, e.g., a list of prioritized operator controlled PLMNs stored on a wireless device, e.g., as further described herein.

Steering of Roaming PLMN List Update

In current implementations, a wireless device (e.g., a user equipment device (UE)) may store a list of prioritized operator controlled public land mobile network (PLMN) identifiers (IDs). The list of prioritized operator controlled PLMN (OPLMN) IDs may be referred to as a steering of roaming (SoR) list and may be used by a UE during a roaming condition to select a new OPLMN. In some implementations, e.g., such as 3GPP LTE, an SoR refresh procedure may be used to update the prioritized OPLMN ID list. In other implementations, e.g., such as 3GPP 5G NR, the prioritized OPLMN ID list (e.g., SoR transparent container) may be sent by a home PLMN (HPLMN) during a registration procedure and/or via downlink direct transfer. Exchange of an SoR transparent container in a registration accept procedure or a downlink network access stratum (NAS) transfer may be stored in a universal subscriber identity module (USIM) of the UE or on/in a memory of the UE, e.g., based on an SoR information list type. For example, if (and/or when) a list type is a secured packet, then information from the SoR transparent container (e.g., message contents) may be stored in the USIM. Alternatively, if (and/or when) a list type is "PLMN ID and access Technology", then information from the SoR transparent container (e.g., message contents) may be stored on/in the memory of the UE. However, whereas the prioritized OPLMN ID list included in the SoR container may contain many (e.g., more than 100) entries (e.g., OPLMN IDs), the SoR list (e.g., OPLMN Selector with Access Technology list) maintained by the UE may be constrained to a relatively small number of entries (e.g., 16 entries or less, where an entry may correspond to an PLMN ID). Thus, per current implementations, when receiving the SoR container, the UE may replace highest priority entries in the SoR list maintained by the UE. As noted, the SoR container may include multiple entries (PLMN IDs) with varying mobile country codes (MCCs). Thus, in some instances, the highest priority entries may belong to certain MCCs and when the UE updates the SoR list, the UE may lose OPLMN information for those certain MCCs. e.g., based on PLMN IDs for other MCCs having a higher priority than PLMN IDs for those certain MCCs. Further, if the UE loses OPLMN information for those certain MCCs, once the UE moves into a country corresponding to those certain MCCs, the UE may encounter (significant) delays when attempting to camp on those OPLMNs, as the UE may inadvertently attempt to camp on different PLMNs, e.g., based on the updated SoR list.

For example, assume a USIM of a UE has stored an SoR list (e.g., an OPLMN list) for a MCC-1, a MCC-2, a MCC-3, and a MCC-4 (e.g., with a priority order in OPLMN list). Then, when the UE registers on a PLMN-A in MCC-3 and receives an SoR container with MCC-3 and MCC-4 PLMNs only, the UE, per current implementations, replaces highest priority entries (e.g., associated with PLMNs in MCC 1 and MCC-2) with the list received in the SoR container. Hence, a memory of the UE now only has an OPLMN list that includes OPLMNs for MCC-3 and MCC-4. Now, when the UE arrives in a new country, e.g., associated with MCC-1 and/or MCC-2, the UE will initiate, based on the OPLMN list stored on the memory not having any OPLMNs associated with MCC-1 and/or MCC-2, a procedure to randomly select a PLMN. Further, the UE may need to proceed through multiple registration attempts before camping on a most preferred PLMN in MCC-1 and/or MCC-2, leading to a waste of UE resources and degraded user experience.

Figure 9A:
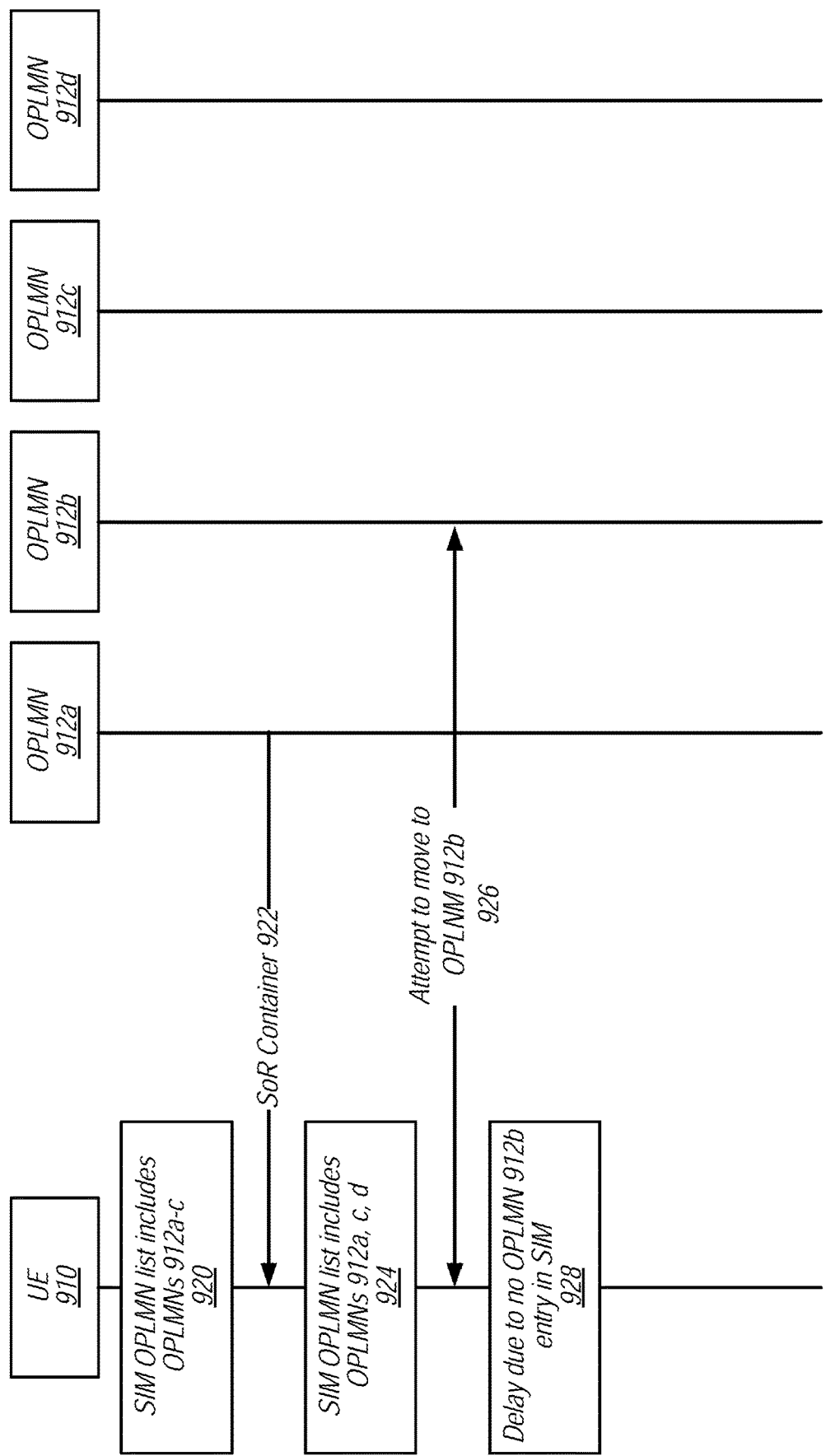
FIGS. 9A-9C illustrate examples of various issues related to SoR list updates.

As another example of SoR list updating issues, FIG. 9A illustrates signaling between a UE, e.g., UE 910, and networks in a first country (e.g., OPLMN 912a) and a second country (e.g., OPLMN 912b). As shown, at 920, a USIM of the UE may contain an OPLMN list (e.g., an SoR list) with PLMNs associated with OPLMNs 912a and 912b, as well as OPLMN 912c (e.g., a third country). Additionally, the UE may be camped on OPLMN 912a and in a roaming condition. The UE may then receive an SoR container 922 with PLMN entries associated with first and third countries as well as a fourth country (e.g., OPLMN 912d). Thus, per current implementations, at 924, the UE may overwrite the OPLMN list with an OPLMN list included in the SoR container. Now, the memory contains an OPLMN list with PLMNs associated with the first, third, and fourth countries (e.g., OPLMNs 912a, 912c, and 912d. Thus, at 926 when the UE attempts to move to OPLMN 912b (e.g., upon entry into the second country and/or in instances in which the first and second countries are neighbors and the UE is near a border between the countries), delays in camping (e.g., at 928) on a preferred PLMN in the second country may be encountered, e.g., the UE may need to proceed through multiple registration attempts before camping on a most preferred PLMN in the second country, leading to a waste of UE resources and degraded user experience.

Figure 9B:
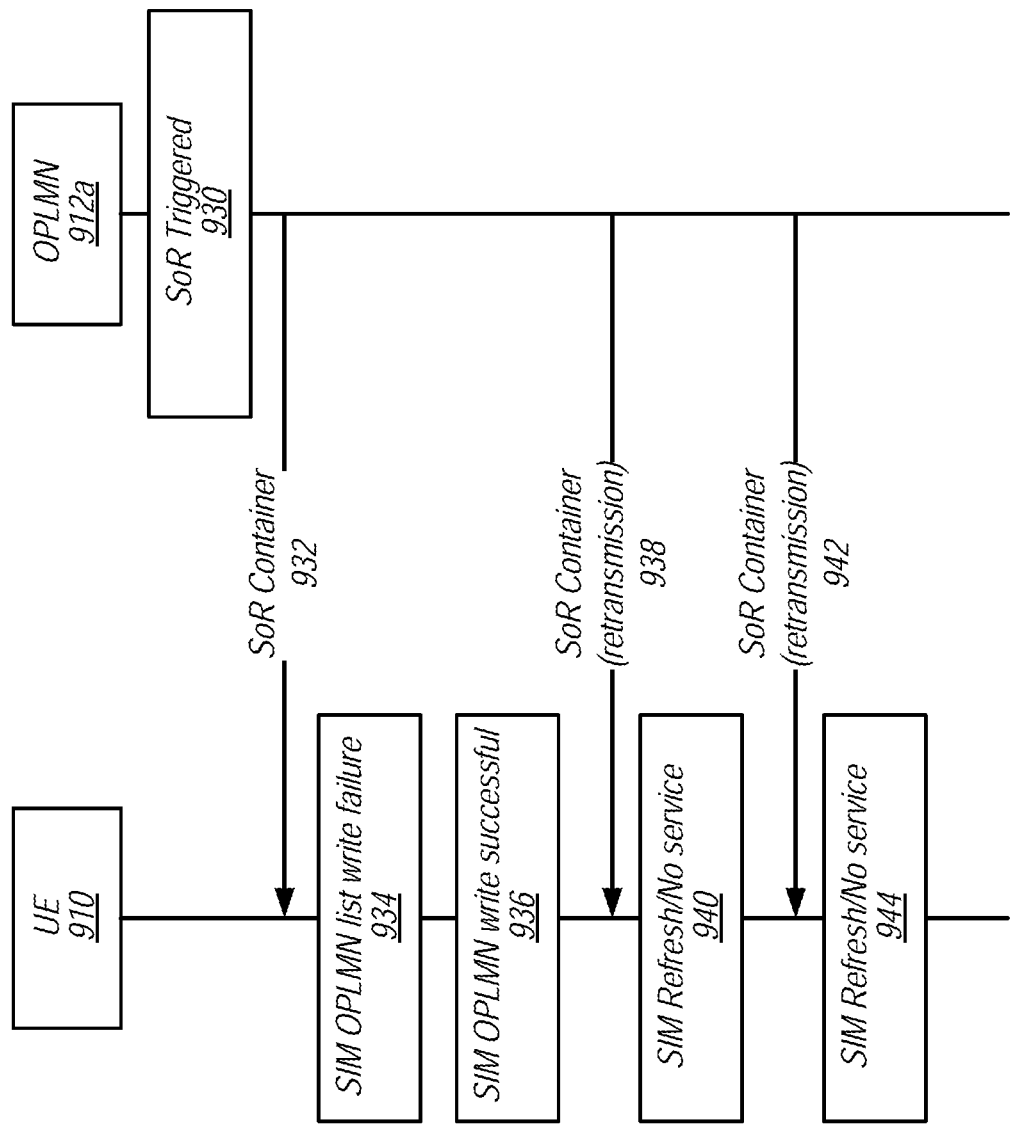

In some instances of current implementations, the UE may receive an SoR container via a secure packet and perform a USIM refresh after an OPLMN overwrite based on the SoR container. However, there is a possibility of a USIM refresh with an OPLMN write failure, thereby causing, loss of the SoR list. Further, retransmission of the SoR container and/or lower layer failure causing multiple reception of same the SoR container may cause the UE to continue to perform a USIM refresh and thus, may cause no service durations to during roaming. For example, FIG. 9B illustrates an issue with SoR list update due to SoR container retransmission. As shown, a UE (e.g., UE 910) may be camped on an OPLMN (e.g., OPLMN 912a). At 930, the OPLMN may trigger an SoR update, and, in response, may send an SoR container 932 to the UE. The UE may attempt to write contents of the SoR container to a USIM of the UE (e.g., to update an SoR list), however, at 934, the write may fail. Further, at 936, the UE may successfully reattempt to write the contents of the SoR container to the USIM. However, due to the failure at 934, the OPLMN may attempt retransmission of the SoR container, e.g., SoR container (retransmission) 938. At 940, the UE may attempt a SIM refresh based on receipt of the retransmission and enter a no service condition. This process may be repeated with the OPLMN sending another SoR container (retransmission) 942 and the UE attempting, at 944, a SIM refresh and entering a no service condition. Such a loop may continue and lead to a waste of UE resources and degraded user experience.

Figure 9C:
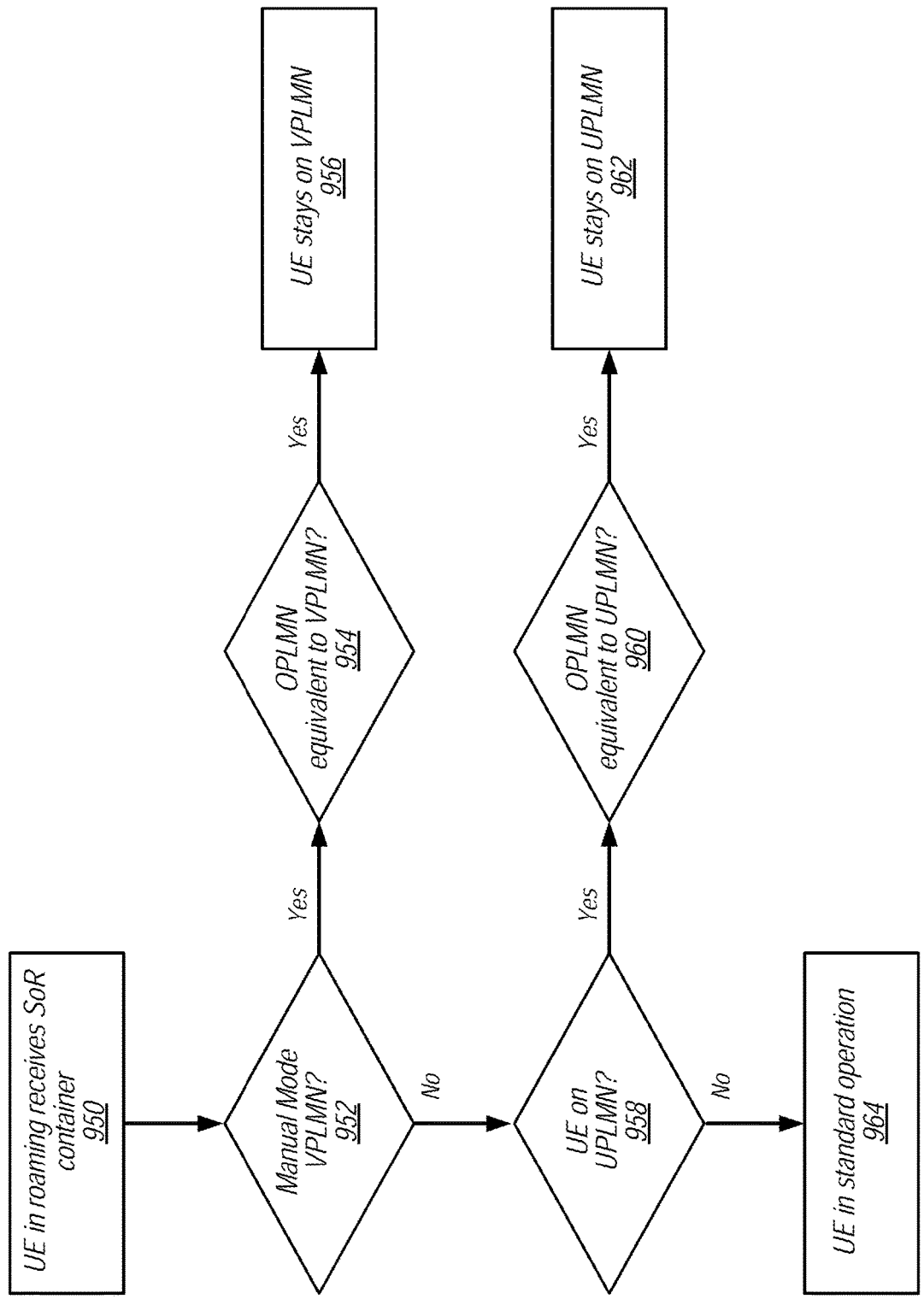

As another example of an issue when updating an SoR list, FIG. 9C illustrates an example of a decision diagram in which a UE remains on a VPLMN and/or a UPLMN although an equivalent OPLMN is available. At 950, a UE may be in roaming and may receive an SoR container, which may be an indication that a home network intends to redirect the UE to a respective OPLMN (visited PLMN). At 952, the UE may determine whether it is in a manual mode of operation on a VPLMN, e.g., with regards to selection of a PLMN. At 954, when the UE is in manual mode and camped on a VPLMN which is not a part of user PLMN (UPLMN) or an OPLMN (new or old), the UE may determine whether the OPLMN is equivalent to the VPLMN. As shown at 956, according to current implementations, the UE may remain on the VPLMN, e.g., even when the OPLMN is a higher priority PLMN and may offer better service. Further, the UE may remain on the VPLMN even when the OPLMN is equivalent to VPLMN. Further, as shown, if the UE is not in manual mode but is camped on VPLMN, the UE may, at 958 determine whether the UE is on a VPLMN which is part of UPLMN but not part of the OPLMN list. At 960, when the UE is on a UPLMN, the UE may determine whether the OPLMN is equivalent to the UPLMN. As shown at 962, according to current implementations, the UE may remain on the UPLMN, e.g., even when the OPLMN is a higher priority PLMN and may offer better service. Further, the UE may remain on the VPLMN even when the OPLMN is equivalent to VPLMN/UPLMN. At 964, if the UE is not on a UPLMN, the UE may continue with standard operations, e.g., in response to receiving the SoR container.

Further, in current implementations, control plane solutions for SoR in 5G NR are specified in 3GPP TS 23.122 which indicates that when a UE camps in a roaming network, an HPLMN may steer the UE to a most preferred network by sending an SoR container as part of an initial registration and/or downlink network access stratum transport message. However, there are scenarios where the UE is unable to successfully receive and/or store the SoR container that results in adding the current VPLMN to "PLMNs where registration was aborted due to SoR". Further, problems may arise when the UE maintains this list that could prevent the UE from getting normal service and/or the UE getting stuck in low priority PLMN. For the following examples of issues that may arise, consider the following use case in which it may be assumed that two VPLMNs are deployed and/or available in a current country (and the UE may have OPLMN list in SIM):

1. UE triggers registration on VPLMN-1;
2. Registration accept is received;
3. Conditions to add the current PLMN to "PLMNs where registration was aborted due to SOR" is met, so VPLMN-1 is now added to the list;
4. Connection is released;
5. UE attempts high priority PLMN search and finds VPLMN-2 that likely is a low priority PLMN;
6. UE attempts registration on the VPLMN-2;
7. Registration accept is received
8. After registration complete, UE stays in VPLMN-2, adds VPLMN-2 to "PLMNs where registration was aborted due to SoR";
9. UE attempts high priority PLMN scan; and
10. Periodic HPLMN scan continues.

In the above use case, various UE behavior are not specified by 3GPP TS 23.122 (e.g., current implementations).

For example, current implementations do not specify UE behavior after losing a cell on a VPLMN when the UE finds another low priority VPLMN (e.g., part of PLMNs where registration was aborted due to SoR list). For example, in current implementations, the UE may pick a PLMN from an OPLMN list that is already treated as a lowest priority VPLMN since the VPLMN is part of PLMNs where registration was aborted due to SoR even though other OPLMNs are available. Additionally, UE behavior after registration reject may cause a 5GMM to enter a PLMN-SEARCH state is not defined by standard. For example, there are many references within 3GPP standards of a UE entering PLMN-SEARCH and then performing PLMN selection as part of handling registration reject, de-registration, service reject, and so forth. However, there is no definition of UE behavior when the UE aborts having PLMNs where a registration was aborted due to SoR list. In other words, 3GPP standards make no mention of how UE should handle PLMN selection on a VPLMN that is present in the SoR list. Further, current implementations do not specify and/or incorrectly specify UE behavior during high priority PLMN selection when the UE has PLMNs where registration was aborted due to SoR list. For example, when the UE has registered on an VPLMN and there is an SoR error case, the UE periodically looks for a higher priority PLMN and attempts to obtain service on a higher priority PLMN as specified in the 3GPP standards. However, current 3GPP specifications do not specify handling when the UE has one or more VPLMNs in a "registration was aborted due to SoR" list. Additionally, current implementations do not specify UE behavior when the UE is camped on a VPLMN and its equivalent PLMNs for VPLMN where registration was aborted due to SoR list. For example, when the UE has registered on VPLMN and has equivalent PLMNs which are part of higher priority PLMNs, SoR fails on current a VPLMN and current 3GPP specifications are not clear about the equivalent PLMNs of the VPLMN when current VPLMN is added to "registration was aborted due to SoR" and considered lowest priority. Additionally, current implementations do not specify UE behavior when an SoR container is received while in manual mode and/or while the UE is on a user controlled PLMN. For example, when the UE has registered on a VPLMN and is in a manual mode of operation and successfully receives SoR information, there is no clarity in specification to remain on current chosen VPLMN.

In some implementations, there may be instances when a USIM of a UE does not have an OPLMN list and/or has an OPLMN list with no matching VPLMN in the current country. In such instances, the UE may find random PLMNs in the visited country and may initially camp on a random PLMN where an SoR check fails. The failure may cause the random plmn to be added to the "PLMNs where registration was aborted due to SOR list." Once this occurs, the UE may not rigger any high priority PLMN search as there are no other higher priority PLMNs in the USIM list (OPLMN, UPLMN), thereby leading to degraded user experience.

In some implementations the UE may miss sending a registration complete message, at least in some instances. For example, in some instances, in order to send a registration complete message, the UE may need to satisfy multiple conditions according to 3GPP TS 23.122. However, if the UE does not satisfy both conditions, e.g., if the UE is in manual mode, the UE may be barred by the standard from sending a registration complete message to the network (e.g., to an AMF of the network).

Embodiments described herein provide systems, methods, and mechanisms to manage SoR list updates as well as selection of an OPLMN from an SoR list. In some embodiments, a UE, such as UE 106, may, upon receiving an SoR container, replace entries in an SoR list (e.g., an OPLMN Selector with Access Technology list) corresponding to MCCs included in the SoR container. In some embodiments, a UE, such as UE 106, may, upon receiving an SoR container, store a current SoR list in memory prior to updating an OPLMN list stored on a USIM of the UE with a list included in the SoR container. In some embodiments, the UE may consider the OPLMN list stored in memory as a lower priority list as compared to the SoR list stored on the USIM. In some embodiments, when the UE detects a failure to update a USIM OPLMN based on a received SoR container, the UE may store the SoR container in memory and retry updating the USIM based on the received SoR container (e.g., retrieved from memory), e.g., after expiration of a higher priority PLMN (HPPLMN) search timer. In some embodiments, when the UE detects receipt of an SoR container, the UE may store SoR container in memory and compare contents of the SoR container to the OPLMN list of the USIM. In some embodiments, if the contents of the SoR container and the SoR list are equivalent (e.g., the same), the UE may ignore the SoR container. In some embodiments, when the UE is in manual mode and camped on a VPLMN which is not a part of user PLMN (UPLMN) or an OPLMN (new or old) and receives an SoR container indicating that a home network intends the UE to move to a particular OPLMN, the UE may move to the OPLMN instead of remaining on the VPLMN. In some embodiments, if the UE is in manual mode but is camped on VPLMN which is part of UPLMN but not part of the OPLMN list and receives an SoR container indicating that a home network intends the UE to move to a particular OPLMN, the UE may move to the OPLMN instead of remaining on the UPLMN.

For example, in some embodiments, upon receiving an SoR container (e.g., containing an SoR PLMN ID and Access Technology List, instead of replacing highest priority entries in an "Operator Controlled PLMN Selector with Access Technology" list stored on a USIM of a UE, such as UE 106, the UE may replace entries with a corresponding MCC from the SoR PLMN ID and Access Technology List. In other words, the UE may compare MCCs in the received SoR PLMN ID and Access Technology List with MCCs in a current "Operator Controlled PLMN Selector with Access Technology" list stored on the USIM of the UE. Then, based on the comparison, the UE may replace PLMN IDs with MCCs corresponding to MCCs found in the received SoR PLMN ID and Access Technology List. In this manner, the UE may only update PLMN ID list entries with MCCs corresponding to MCCs received in the SoR container. In some embodiments, such an approach may allow the UE to find a preferred PLMN faster and acquire service earlier when entering and/or encountering new countries. Additionally, in some embodiments, such an approach may allow a carrier to change operator preferred PLMNs (OPLMNs) for a specific (and/or particular) country without affecting OPLMNs from other countries that are not being updated and/or changed.

As another example, in some embodiments, a UE, such as UE 106, may, upon receiving an SoR container, store a current USIM OPLMN list in memory prior to updating an OPLMN list stored on a USIM of the UE with a list included in the SoR container. In some embodiments, the UE may consider the OPLMN list stored in memory as a lower priority list as compared to the OPLMN list stored on the USIM. For example, in some embodiments, after receiving an SoR request (e.g., an SoR container) to update an OPLMN list stored in/on a USIM of the UE, the UE may, instead of overwriting and deleting all current OPLMN entries in an "Operator Controlled PLMN Selector with Access Technology", store current entries in memory of the UE with the PLMN ID and Access Technology List. In such embodiments, the OPLMN list stored in memory may be considered as a lower priority list than the OPLMN list stored on the USIM. In some embodiments, such an approach may allow the UE to directly use a PLMN corresponding to respective country and proceed with attachment and registration more rapidly, e.g., as illustrated by FIG. 10A.

Figure 10A:
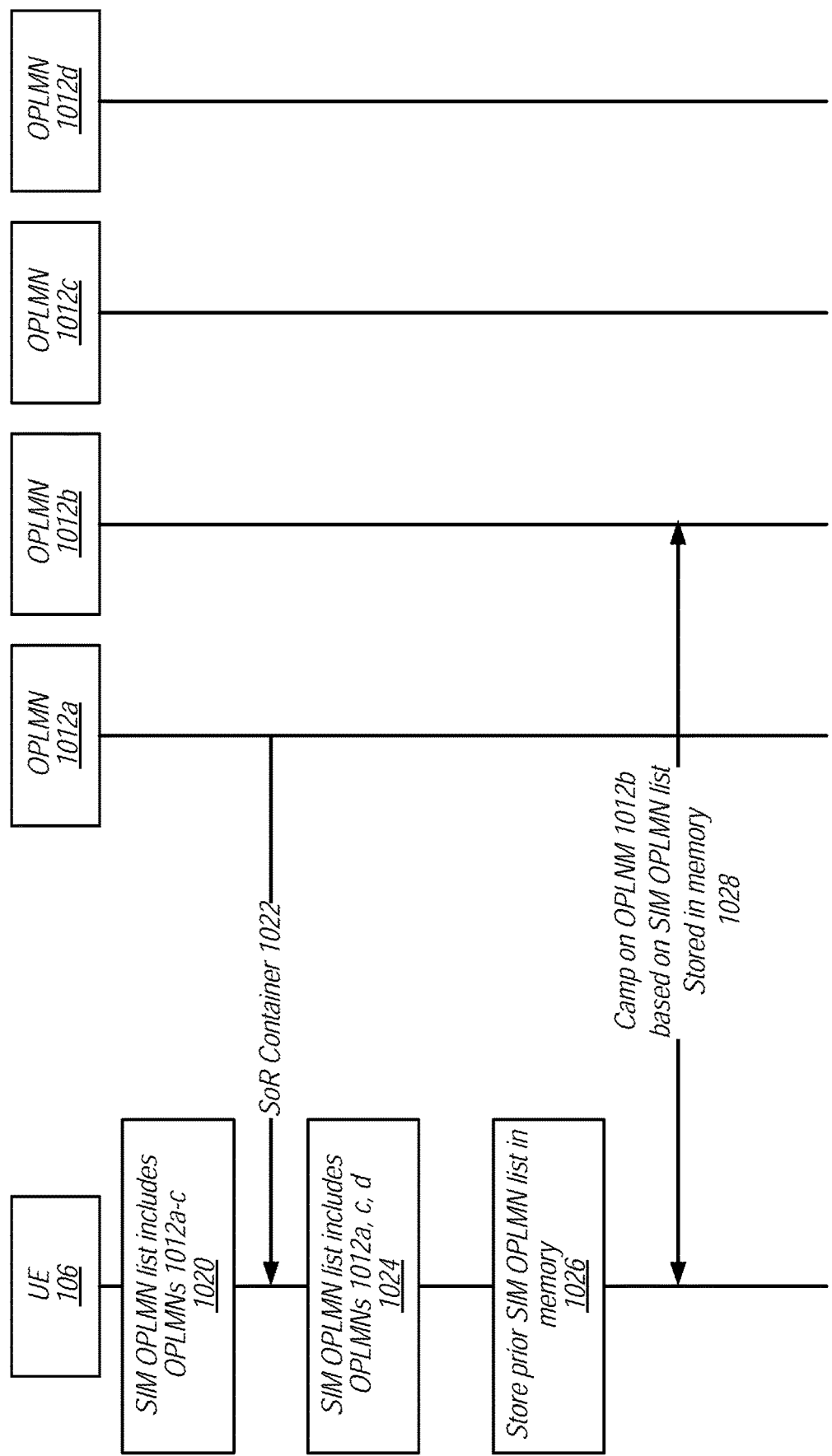
FIG. 10A illustrates an example of signaling to update an SoR list, according to some embodiments.

FIG. 10A illustrates an example of signaling to update an SoR list, according to some embodiments. As shown, at 1020, a USIM of a UE, such as UE 106, may contain an OPLMN list (e.g., an SoR list) with PLMNs associated with a first country (OPLMN 1012*a*) and a second country (OPLMN 1012*b*), as well as a third country (OPLMN 1012*c*). Additionally, UE 106 may be camped on OPLMN 1012*a* and in a roaming condition. UE 106 may then receive an SoR container 1022, e.g., via a secure packet, with PLMN entries associated with the first and third countries, as well as a fourth country (e.g., OPLMN 1012*d*). At 1024, UE 106 may determine that the received OPLMN list includes PLMNs associated with the first, third, and fourth countries (e.g., OPLMNs 1012*a*, 1012*c*, and 1012*d*), but not the second country (e.g., OPLNM 1012*b*). Further, at 1026, UE 106 may store the OPLMN list with PLMNs associated with a first country, second country, and third country in a memory of UE 106 and store the received OPLMN list on the USIM. Note that the UE may consider the OPLMN list stored in memory as a lower priority than the OPLMN list stored on the USIM. In other words, the UE may first consider OPLMNs stored on the USIM prior to considering OPLMNs stored in memory. Then, at 1028, when UE 106 attempts to move to OPLMN 912*b* (e.g., upon entry into the second country and/or in instances in which the first and second countries are neighbors and the UE is near a border between the countries), UE 106 may refer to the OPLMN list stored in memory upon determining that the OPLMN list stored on the USIM does not include an OPLMNs associated with an MCC corresponding to the second country.

Figure 10B:
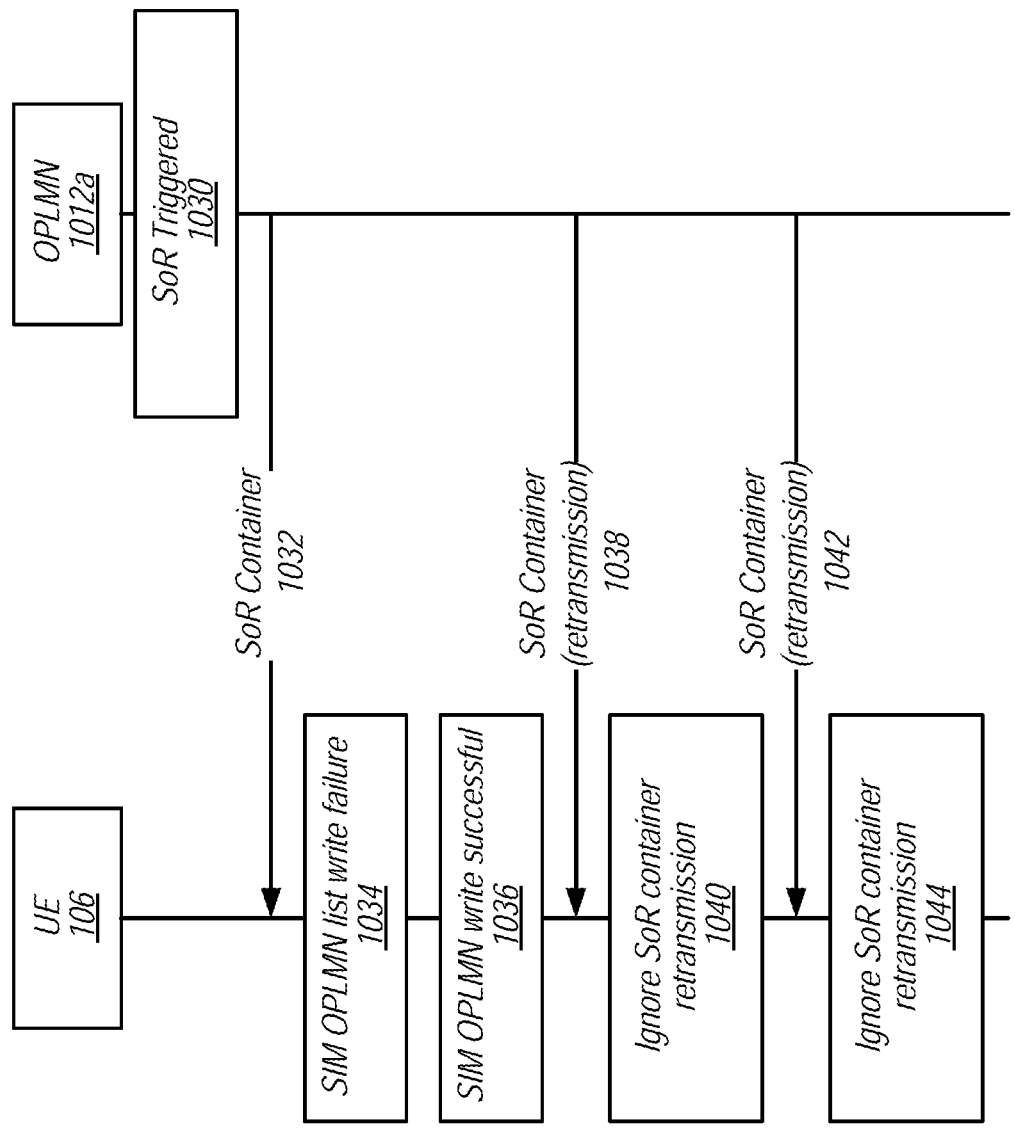
FIG. 10B illustrates another example of signaling to update an SoR list, according to some embodiments.

As a further example, in some embodiments, when a UE, such as UE 106, detects a failure to update a USIM based on a received SoR container, the UE may store the SoR container in memory and retry updating the USIM based on the received SoR container (e.g., retrieved from memory), e.g., after expiration of a higher priority PLMN (HPPLMN) search timer. For example, in some embodiments, upon failure to write (store) an OPLMN list (received via a secure SoR container) to a USIM of the UE and determining that a new SoR container has not been received, the UE may store the SoR container (e.g., the SoR container the UE failed to store on the USIM) in a memory of the UE. Additionally, the UE may attempt to retry storing (and/or writing) the received SoR container to the USIM after expiration of a higher priority PLMN (HPPLMN) search timer. For example, in case of a universal integrated circuit card (UICC) write failure, the UE may store the SoR container in memory and re-attempt storing the SoR container on the UICC a configured and/or specified number of times after HPPLMN timer expiration. Further, upon retransmission of the SoR container and/or upon a lower layer failure causing multiple reception of the SoR container, the UE may store the SoR container in memory and compare contents of the retransmitted SoR container to the originally received SoR container. In some embodiments, upon determining that the contents are the same, the UE may ignore the retransmitted SoR container and continue with standard operation (e.g., with respect to current tracking area and/or backoff timer), e.g., as illustrated by FIG. 10B. In other words, instead of deleting OPLMN entries in an "Operator Controlled PLMN Selector with Access Technology" list in the USIM every time upon receipt of the same SoR container, the UE may send acknowledgement to the network and not perform a SIM refresh. Said another way, in cases in which a received SoR container includes a previously received OPLMN list (e.g., with same ordered priority), the UE may not upload (e.g., write and/or store) the SoR container to the USIM (and/or UICC).

FIG. 10B illustrates another example of signaling to update an SoR list, according to some embodiments. As shown, a UE, such as UE 106, may be camped on an OPLMN (e.g., OPLMN 912a). At 1030, the OPLMN may trigger an SoR update, and, in response, may send an SoR container 1032 to UE 106. UE 106, upon receipt of the SoR container, may attempt to write contents of the SoR container to (e.g., store the contents of the SoR container on) a USIM of UE 106 (e.g., to update an SoR list), however, at 1034, the write may fail. Further, UE 106 may store the SoR container in memory and retry updating the USIM based on the received SoR container (e.g., retrieved from memory), e.g., after expiration of a higher priority PLMN (HPPLMN) search timer. Thus, at 1036, UE 106 may successfully reattempt to write (and/or store) the contents of the SoR container to the USIM e.g., upon expiration of the HPPLMN search timer. However, due to the failure at 1034, the OPLMN may attempt retransmission of the SoR container, e.g., SoR container (retransmission) 1038. At 1040, UE 106, upon determining that the retransmitted SoR container is the same as the SoR container previously received, may ignore the SoR container retransmission. Similarly, due to the failure at 1034, the OPLMN may again attempt retransmission of the SoR container, e.g., SoR container (retransmission) 1042. Further, at 1044, UE 106, upon determining that the retransmitted SoR container is the same as the SoR container previously received, may again ignore the SoR container retransmission.

As another example, in some embodiments, when the UE detects receipt of an SoR container, the UE may store SoR container in memory and compare contents of the SoR container to the SoR list of the USIM. In some embodiments, if the contents of the SoR container and the SoR list are equivalent (e.g., the same), the UE may ignore the SoR container. In some embodiments, when the UE is in manual mode and camped on a VPLMN which is not a part of user PLMN (UPLMN) or an OPLMN (new or old) and receives an SoR container indicating that a home network intends the UE to move to a particular OPLMN, which is equivalent PLMN to current VPLMN, the UE may move to the OPLMN instead of remaining on the VPLMN. In some embodiments, if the UE is in manual mode camped on a VPLMN which is part of UPLMN but not part of the OPLMN list and receives an SoR container indicating that a home network intends the UE to move to a particular OPLMN, the UE may move to the OPLMN instead of remaining on the UPLMN, e.g., if the OPLMN is equivalent PLMN to UPLMN. In some embodiments, 3GPP TS 22.011 section 3.2.2.8 may be updated to state that "If the UE is in manual mode, the redirection request shall be ignored, unless redirection is requested to equivalent to manual selected PLMN." In some embodiments, 3GPP TS 23.122 Note 6 may be updated to state that "When the UE is in the manual mode of operation, the UE stays on the VPLMN; unless new high priority OPLMN is equivalent to manual selected VPLMN."

Figure 10C:
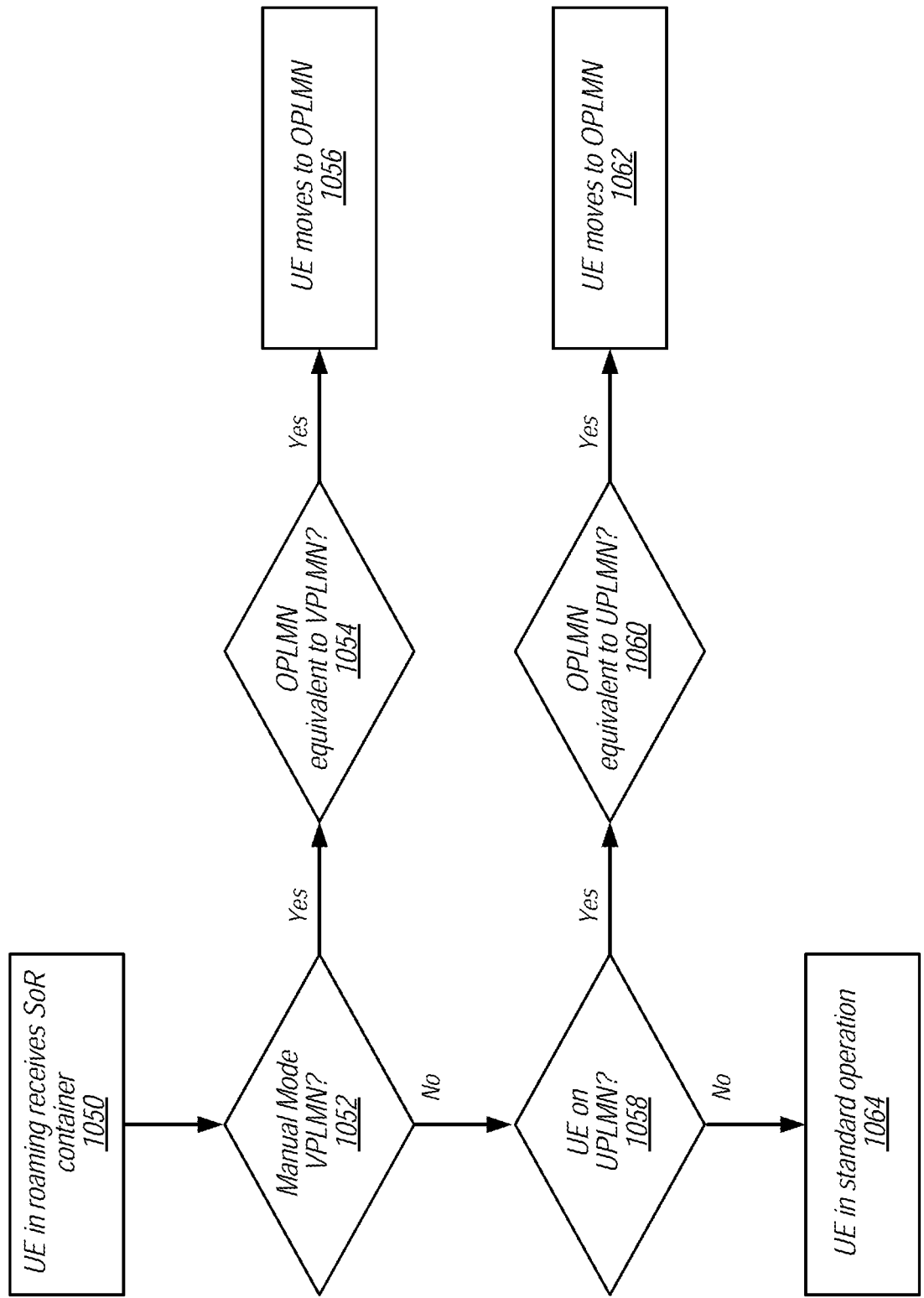
FIG. 10C illustrates an example of a flow diagram of a method for selecting an OPLMN, according to some embodiments.

FIG. 10C illustrates an example of a flow diagram of a method for selecting an OPLMN, according to some embodiments. At 1050, a UE, such as UE 106, may be in roaming and may receive an SoR container, which may be an indication that a home network intends to redirect the UE to a respective OPLMN (visited PLMN). At 1052, the UE may determine whether it is in a manual mode of operation on a VPLMN, e.g., with regards to selection of a PLMN. At 1054, when the UE is in manual mode and camped on a VPLMN which is not a part of user PLMN (UPLMN) or an OPLMN (new or old), the UE may determine whether the OPLMN is equivalent to the VPLMN. As shown at 1056, upon determining that the OPLMN is equivalent to the VPLMN and/or that the OPLMN is a higher priority PLMN, the UE may move to the OPLMN. Further, as shown, if the UE is not in manual mode but is camped on VPLMN, the UE may, at 1058 determine whether the UE is on a VPLMN which is part of UPLMN but not part of the OPLMN list. At 1060, when the UE is on a UPLMN, the UE may determine whether the OPLMN is equivalent to the UPLMN. As shown at 1062, upon determining that the OPLMN is equivalent to the UPLMN and/or that the OPLMN is a higher priority PLMN, the UE may move to the OPLMN. At 1064, if the UE is not on a UPLMN, the UE may continue with standard operations, e.g., in response to receiving the SoR container.

In some embodiments, when a UE, such as UE 106, loses a cell on a VPLMN and when the UE finds another low priority VPLMN (e.g., part of PLMNs where registration was aborted due to SoR list) and/or when, after a registration reject causes a 5GMM to enter a PLMN-SEARCH state, the UE may consider PLMNs in "PLMNs where registration was aborted due to SoR list" as a lower priority than each PLMN/access technology combination in the "Operator Controlled PLMN Selector with Access Technology" data file in a SIM of the UE (e.g., in priority order) or stored in a memory of the UE (e.g., in priority order). In some embodiments, 3GPP TS 23.122, section 4.4.3.1.1 may be updated to state:

The MS selects and attempts registration on other PLMN/access technology combinations, if available and allowable, in the following order:
i) either the HPLMN (if the EHPLMN list is not present or is empty) or the highest priority EHPLMN that is available (if the EHPLMN list is present);
ii) each PLMN/access technology combination in the "User Controlled PLMN Selector with Access Technology" data file in the SIM (in priority order);
iii) each PLMN/access technology combination in the "Operator Controlled PLMN Selector with Access Technology" data file in the SIM (in priority order) or stored in the ME (in priority order) with an exception that the PLMNs in "PLMNs where registration was aborted due to SOR list" are considered as lowest priority with iii);
iv) other PLMN/access technology combinations with received high quality signal in random order;

v) other PLMN/access technology combinations in order of decreasing signal quality . . . .

In some embodiments, during high priority PLMN selection when the UE has PLMNs where registration was aborted due to SoR list, a UE, such as UE 106, may consider equivalent PLMNs in "PLMNs where registration was aborted due to SOR list" as a lower priority than equivalent PLMNs of the same country code as a current serving VPLMN. In some embodiments, 3GPP TS 23.122, section 4.4.3.3.1 may be updated to state:

. . . The attempts to access the HPLMN or an EHPLMN or higher priority PLMN shall be as specified below:

. . . e) If the HPLMN (if the EHPLMN list is not present or is empty) or a EHPLMN (if the list is present) or a higher priority PLMN is not found, the MS shall remain on the VPLMN.

f) In steps i), ii) and iii) of subclause 4.4.3.1.1 the MS shall limit its attempts to access higher priority PLMN/access technology combinations to PLMN/access technology combinations of the same country as the current serving VPLMN, as defined in Annex B.

g) Only the priority levels of Equivalent PLMNs of the same country as the current serving VPLMN, as defined in Annex B, shall be taken into account to compare with the priority level of a selected PLMN with an exception that the equivalent PLMNs in "PLMNs where registration was aborted due to SOR list' are considered as lowest priority.

h) If the PLMN of the highest priority PLMN/access technology combination available is the current VPLMN, or one of the PLMNs in the "Equivalent PLMNs" list, the MS shall remain on the current PLMN/access technology combination . . . .

In some embodiments, when a UE, such as UE 106, is camped on a VPLMN and its equivalent PLMNs for VPLMN where registration was aborted due to SoR list, the UE may only consider a current PLMN as lowest priority but not equivalent PLMNs. In other words, the UE may not consider equivalent PLMNs as a lowest priority when a current PLMN is added to a "registration was aborted due to SoR list." In some embodiments, 3GPP TS 23.122, Annex C, section C.2 may be updated to state:

For the steps below, security protection is described in 3GPP TS 33.501 [24] . . . .

8) If:

a) the UE's USIM is configured with indication that the UE is to receive the steering of roaming information due to initial registration in a VPLMN, but neither the list of preferred PLMN/access technology combinations nor the secured packet nor the HPLMN indication that 'no change of the "Operator Controlled PLMN Selector with Access Technology" list stored in the UE is needed and thus no list of preferred PLMN/access technology combinations is provided' is received in the REGISTRATION ACCEPT message, when the UE performs initial registration in a VPLMN or if the steering of roaming information is received but the security check is not successful; and b) the current chosen VPLMN is not contained in the list of "PLMNs where registration was aborted due to SOR", not part of "User Controlled PLMN Selector with Access Technology" list, the UE is not in manual mode of operation;

then the UE shall send the REGISTRATION COMPLETE message to the serving AMF without including an SOR transparent container, release the current N1 NAS signalling connection locally, store the PLMN identity in the list of "PLMNs where registration was aborted due to SOR" and attempt to obtain service on a higher priority PLMN as specified in subclause 4.4.3.3 by acting as if timer T that controls periodic attempts has expired, with an exception that the current PLMN is considered as lowest priority, and skip steps 9 to 12;

Note: The above exception applies only to the current PLMN and not for its equivalent PLMNs . . . .

In some embodiments, when an SoR container is received by a UE, such as UE 106, while in manual mode and/or while the UE is on a user controlled PLMN, the UE may stay on a current VPLMN. In some embodiments, 3GPP TS 23.122, Annex C, section C.2 may be updated to state:

For the steps below, security protection is described in 3GPP TS 33.501 [24] . . . .

7) If the steering of roaming information is received and the security check is successful, then:

a) if the steering of roaming information contains a secured packet (see 3GPP TS 31.115 [67]): . . . .

if the UDM has not requested an acknowledgement from the UE and the ME receives a USAT REFRESH command qualifier (3GPP TS 31.111 [41]) of type "Steering of Roaming" it shall perform items a), b) and c) of the procedure for steering of roaming in subclause 4.4.6 and if the UE has a list of available and allowable PLMNs in the area and based on this list the UE determines that there is a higher priority PLMN than the selected VPLMN and the UE is in automatic network selection mode, then the UE shall either:

i) release the current N1 NAS signalling connection locally and then attempt to obtain service on a higher priority PLMN as specified in subclause 4.4.3.3 by acting as if timer T that controls periodic attempts has expired. In this case, steps 8 to 11 are skipped. If the UE has an established emergency PDU session (see 3GPP TS 24.501 [64]), the receipt of the steering of roaming information shall not trigger the release of the N1 NAS signalling connection. The UE shall release the current N1 NAS signalling connection locally subsequently after the emergency PDU session is released; or ii) not release the current N1 NAS signalling connection locally and skip steps 8 to 10;

b) if the steering of roaming information contains the list of preferred PLMN/access technology combinations, the ME shall replace the highest priority entries in the "Operator Controlled PLMN Selector with Access Technology" list stored in the ME with the received list of preferred PLMN/access technology combinations. Additionally, if the UDM has not requested an acknowledgement from the UE and if the UE has a list of available and allowable PLMNs in the area and based on this list the UE determines that there is a higher priority PLMN than the selected VPLMN and the UE is in automatic network selection mode, then the UE shall send the REGISTRATION COMPLETE message to the serving AMF without including an SOR transparent container and then either:

i) release the current N1 NAS signalling connection locally and then attempt to obtain service on a higher priority PLMN as specified in subclause 4.4.3.3 by acting as if timer T that controls periodic attempts has expired. In this case, steps 8 to 11 are skipped. If the UE has an established emergency PDU session (see 3GPP TS 24.501 [64]), the receipt of the steering of roaming information shall not trigger the release of the N1 NAS signalling connection. The UE shall release the current N1 NAS signalling connection locally subsequently after the emergency PDU session is released; or ii) not release the current N1 NAS signalling connection locally and skip steps 8 and 10;

Note: When the UE is in the manual mode of operation, the UE stays on the VPLMN . . . .

In some embodiments, when a UE, such as UE 106, does not have an OPLMN list and/or has an OPLMN list with no matching VPLMN in the current country, the UE may continue to search for random PLMNs, e.g., to receive an SoR container. In some embodiments, 3GPP TS 23.122, section 4.4.3.1.1 may be updated to state:

iii) each PLMN/access technology combination in the "Operator Controlled PLMN Selector with Access Technology" data file in the SIM (in priority order) or stored in the ME (in priority order);

iv) other PLMN/access technology combinations with received high quality signal in random order;

v) other PLMN/access technology combinations in order of decreasing signal quality.

When following the above procedure the following requirements apply: . . .

p) In iii, the MS shall use the PLMN/access technology combination in the "Operator Controlled PLMN Selector with Access Technology" stored in the ME, if the last received steering of roaming information contains the "list of preferred PLMN/access technology combinations" (see annex C) and is stored in the ME. Otherwise, the MS shall use the "Operator Controlled PLMN Selector with Access Technology" list retrieved from the SIM, with an exception that the PLMNs in "PLMNs where registration was aborted due to SOR list" are considered as lowest priority in iii) . . . .

q) In iv) and v), the PLMNs in "PLMNs where registration was aborted due to SOR list" are considered as lowest priority.

In some embodiments, when a UE, such as UE 106, is in manual mode, the UE may store a PLMN identity in the list of "PLMNs where registration was aborted due to SOR" and attempt to obtain service on a higher priority PLMN, e.g., by acting as if a timer, T, that controls periodic attempts has expired, with an exception that the current PLMN is considered as lowest priority. Additionally, the UE may send (transmit) a registration complete message to a serving AMF without including an SOR transparent container. In some embodiments, 3GPP TS 23.122, Annex C, section C.2 may be updated to state:

. . . 8) If:

a) the UE's USIM is configured with indication that the UE is to receive the steering of roaming information due to initial registration in a VPLMN, but neither the list of preferred PLMN/access technology combinations nor the secured packet nor the HPLMN indication that 'no change of the "Operator Controlled PLMN Selector with Access Technology" list stored in the UE is needed and thus no list of preferred PLMN/access technology combinations is provided' is received in the REGISTRATION ACCEPT message, when the UE performs initial registration in a VPLMN or if the steering of roaming information is received but the security check is not successful; and b) the current chosen VPLMN is not contained in the list of "PLMNs where registration was aborted due to SOR", not part of "User Controlled PLMN Selector with Access Technology" list, the UE is not in manual mode of operation;

store the PLMN identity in the list of "PLMNs where registration was aborted due to SOR" and attempt to obtain service on a higher priority PLMN as specified in subclause 4.4.3.3 by acting as if timer T that controls periodic attempts has expired, with an exception that the current PLMN is considered as lowest priority, and skip steps 9 to 12. The UE shall send the REGISTRATION COMPLETE message to the serving AMF without including an SOR transparent container, release the current N1 NAS signalling connection locally. If the UE has an established emergency PDU session (see 3GPP TS 24.501 [64]), the UE shall release the current N1 NAS signalling connection locally after the release of the emergency PDU session . . . .

FIGS. 11-18 illustrate various methods for a UE, such as UE 106, to update and/or manage an SoR list as well as search and/or selection of PLMNs based on an SoR list, according to some embodiments. The methods shown in FIGS. 11-18 may be used in conjunction with any of the systems, methods, or devices shown in the Figures, among other devices. In other words, the methods shown in FIGS. 11-18 may be combined and/or used in conjunction with one another as well as any of the systems, methods, and/or devices described herein. In various embodiments, some of the method elements shown may be performed concurrently, in a different order than shown, or may be omitted. Additional method elements may also be performed as desired.

Figure 11:
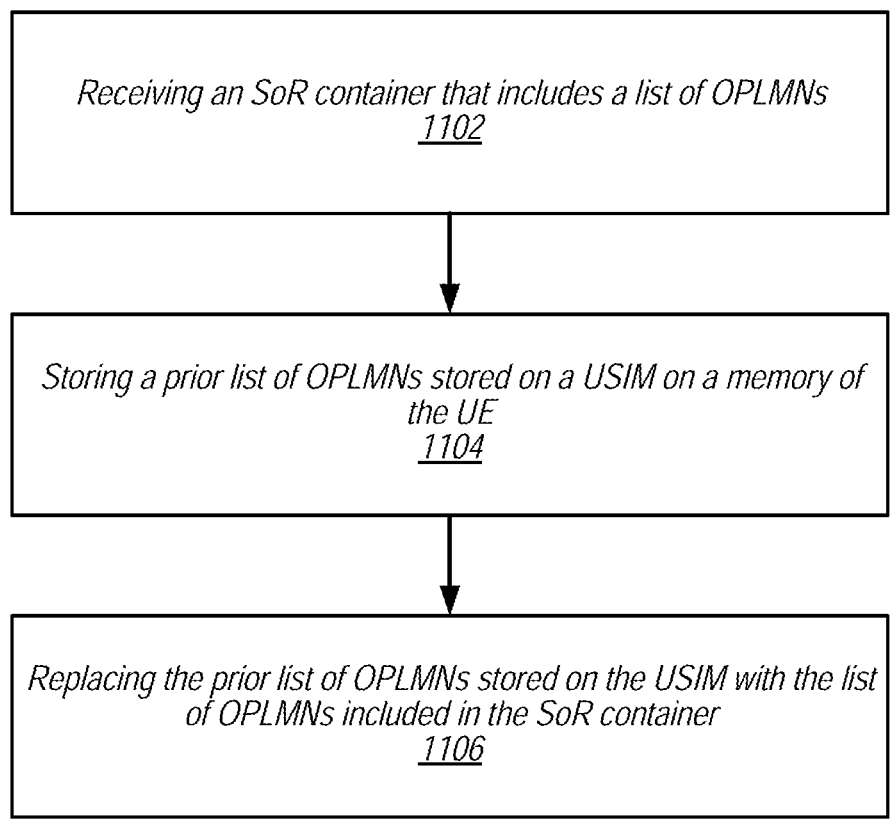
FIG. 11 illustrates a block diagram of an example of a method for updating an SoR list, according to some embodiments.

For example, FIG. 11 illustrates a block diagram of an example of a method for updating an SoR list, according to some embodiments. The method shown in FIG. 11 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1102, a UE, such as UE 106, may receive, from a network (e.g., from a network entity such as base station 102), a steering of roaming (SoR) container. The SoR container may include a list of operator preferred public land mobile networks (OPLMNs). In some embodiments, the SoR container may be a secured packet.

At 1104, the UE may store a prior (and/or current) list of OPLMNs stored on a universal subscriber identity module (USIM) of the UE on a memory of the UE. In other words, the UE may copy a list of OPLMNs (e.g., an SoR list) stored on the USIM to another memory location on the UE.

At 1106, the UE may replace the prior (and/or current) list of OPLMNs stored on the USIM with the list of OPLMNs included in the SoR container. In some embodiments, the UE may treat (e.g., consider) the prior list of OPLMNs (e.g., the list of OPLMNs stored in the memory of the UE) as a lower priority list as compared to the list of OPLMNs stored on the USIM. For example, in some embodiments, in response to determining to move from a current public land mobile network (PLMN), the UE may scan (and/or search) for a new PLMN based on the list of OPLMNs stored on the USIM. Additionally, in response to not discovering a PLMN corresponding to an OPLMN in the list of OPLMNs stored on the USIM, the UE may scan (and/or search) for a new PLMN based on the list of OPLMNs stored in the memory of the UE.

In some embodiments, when the OPLMNs within the list of OPLMNs are associated with a plurality of mobile country codes (MCCs), the UE may compare the list of OPLMNs included in the SoR container to the prior list of OPLMNs. Further, the UE may replace OPLMNs in the prior list of OPLMNs that have an MCC corresponding to an MCC of the plurality of MCCs included in the list of OPLMNs. Additionally, the UE may keep OPLMNs in the prior list of OPLMNs that do not have an MCC corresponding to an MCC of the plurality of MCCs included in the list of OPLMNs.

In some embodiments, when the OPLMNs within the list of OPLMNs are associated with a plurality of mobile country codes (MCCs), the UE may compare the list of OPLMNs included in the SoR container to the prior list of OPLMNs (e.g., currently stored on the USIM) and may determine that at least a portion of OPLMNs in the prior list of OPLMNs do not have an MCC corresponding to an MCC of the plurality of MCCs included in the list of OPLMNs, In such embodiments, storing the prior list of OPLMNs stored on the USIM of the UE on the memory of the UE may be based, at least in part, on the determination.

In some embodiments, the UE may lose a signal to a serving cell on a visited PLMN (VPLMN). In such embodiments, the UE may consider PLMNs in an SoR aborted list as a lower priority than PLMNs stored in the USIM. In some embodiments, the SoR aborted list may be a "PLMNs where registration was aborted due to SoR list."

In some embodiments, the UE may perform a high priority PLMN selection in which the UE has PLMNs where registration was aborted due to an SoR list (e.g., a "PLMNs where registration was aborted due to SoR list"). In such embodiments, the UE may consider, during the high priority PLMN selection, equivalent PLMNs (ePLMNs) in a "PLMNs where registration was aborted due to SoR list" as lower priority than ePLMNs associated with an MCC equivalent to an MCC of a current serving vPLMN.

In some embodiments, the UE may add a current PLMN to an SoR aborted list (e.g., a "PLMNs where registration was aborted due to SoR list"). In such embodiments, in response to adding the current PLMN to the SoR aborted list, the UE may not consider ePLMNs as a lowest priority PLMN based, at least in part, on adding the current PLMN to the SoR aborted list.

In some embodiments, the UE may receive the SoR container while in a manual mode of operation and/or while on a user controlled PLMN (UPLMN). In such embodiments, the UE may remain on a current VPLMN.

In some embodiments, the UE may determine that the UE does not have an OPLMN list and/or has an OPLMN list with no matching VPLMNs in a current country (e.g., based on an MCC of the current country). In such embodiments, the UE may continue to search for random PLMNs to receive an SoR container.

In some embodiments, the UE may store, while in a manual mode of operation, a PLMN identity in an SoR aborted list (e.g., a "PLMNs where registration was aborted due to SoR list"). In such embodiments, in response to storing the PLMN identity in the SoR aborted list, the UE may attempt to obtain service on a higher priority PLMN. In such embodiments, the UE may act (e.g., perform) as if a timer that controls periodic registration attempts has expired and may send a registration complete message to a serving core access and mobility management function (AMF), e.g., such as AMF 704, of the network.

In some embodiments, the UE may fail to replace the prior list of OPLMNs stored on the USIM with the list of OPLMNs included in the SoR container. In such embodiments, the UE may store the list of OPLMNs included in the SoR container in memory and re-attempt storing the list of OPLMNs included in the SoR container on the USIM. In such embodiments, re-attempting to store the list of OPLMNs included in the SoR container on the USIM may occur after expiration of a higher priority PLMN search timer. In some embodiments, the UE may receive a retransmission of the SoR container, determine that contents of the SoR container and contents of the retransmission of the SoR container are the same, and ignore the retransmission of the SoR container.

Figure 12:
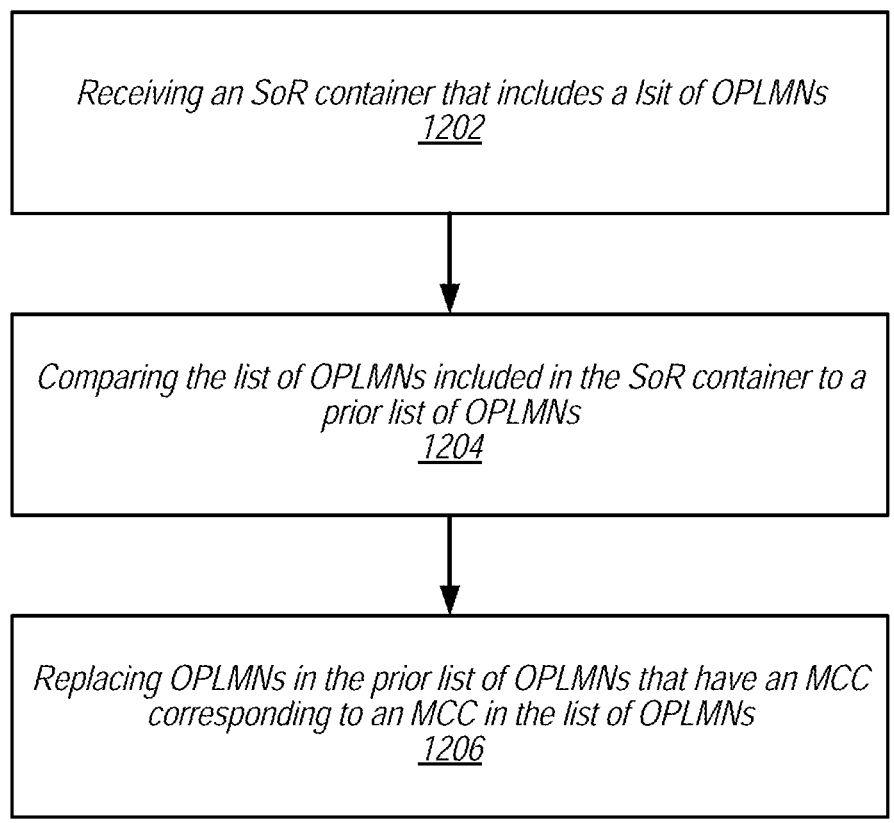
FIG. 12 illustrates a block diagram of another example of a method for updating an SoR list, according to some embodiments.

As another example, FIG. 12 illustrates a block diagram of another example of a method for updating an SoR list, according to some embodiments. The method shown in FIG. 12 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1202, a UE, such as UE 106, may receive, from a network (e.g., from a network entity, such as base station 102), an SoR container that may include a list of OPLMNs. In some embodiments, the OPLMNs within the list of OPLMNs are associated with a plurality of mobile country codes (MCCs). In some embodiments, the SoR container may be a secured packet.

At 1204, the UE may compare the list of OPLMNs included in the SoR container to the prior list of OPLMNs. For example, the UE may compare MCCs associated with the list of OPLMNs included in the SoR container to MCCs associated with the prior list of OPLMNs.

At 1206, the UE may replace OPLMNs in the prior list of OPLMNs that have an MCC corresponding to an MCC of the plurality of MCCs included in the list of OPLMNs. Additionally, the UE may keep OPLMNs in the prior list of OPLMNs that do not have an MCC corresponding to an MCC of the plurality of MCCs included in the list of OPLMNs.

In some embodiments, the UE may store the prior (and/or current) list of OPLMNs stored on a universal subscriber identity module (USIM) of the UE on a memory of the UE. In other words, the UE may copy a list of OPLMNs (e.g., an SoR list) stored on the USIM to another memory location on the UE. Additionally, the UE may replace the prior (and/or current) list of OPLMNs stored on the USIM with the list of OPLMNs included in the SoR container. In some embodiments, the UE may treat (e.g., consider) the prior list of OPLMNs (e.g., the list of OPLMNs stored in the memory of the UE) as a lower priority list as compared to the list of OPLMNs stored on the USIM. For example, in some embodiments, in response to determining to move from a current public land mobile network (PLMN), the UE may scan (and/or search) for a new PLMN based on the list of OPLMNs stored on the USIM. Additionally, in response to not discovering a PLMN corresponding to an OPLMN in the list of OPLMNs stored on the USIM, the UE may scan (and/or search) for a new PLMN based on the list of OPLMNs stored in the memory of the UE.

In some embodiments, the UE may compare the list of OPLMNs included in the SoR container to the prior list of OPLMNs (e.g., currently stored on the USIM) and may determine that at least a portion of OPLMNs in the prior list of OPLMNs do not have an MCC corresponding to an MCC of the plurality of MCCs included in the list of OPLMNs, In such embodiments, storing the prior list of OPLMNs stored on the USIM of the UE on the memory of the UE may be based, at least in part, on the determination.

In some embodiments, the UE may lose a signal to a serving cell on a visited PLMN (VPLMN). In such embodiments, the UE may consider PLMNs in an SoR aborted list as a lower priority than PLMNs stored in the USIM. In some embodiments, the SoR aborted list may be a "PLMNs where registration was aborted due to SoR list."

In some embodiments, the UE may perform a high priority PLMN selection in which the UE has PLMNs where registration was aborted due to an SoR list (e.g., a "PLMNs where registration was aborted due to SoR list"). In such embodiments, the UE may consider, during the high priority PLMN selection, equivalent PLMNs (ePLMNs) in a "PLMNs where registration was aborted due to SoR list" as lower priority than ePLMNs associated with an MCC equivalent to an MCC of a current serving vPLMN.

In some embodiments, the UE may add a current PLMN to an SoR aborted list (e.g., a "PLMNs where registration was aborted due to SoR list"). In such embodiments, in response to adding the current PLMN to the SoR aborted list, the UE may not consider ePLMNs as a lowest priority PLMN based, at least in part, on adding the current PLMN to the SoR aborted list.

In some embodiments, the UE may receive the SoR container while in a manual mode of operation and/or while on a user controlled PLMN (UPLMN). In such embodiments, the UE may remain on a current VPLMN.

In some embodiments, the UE may determine that the UE does not have an OPLMN list and/or has an OPLMN list with no matching VPLMNs in a current country (e.g., based on an MCC of the current country). In such embodiments, the UE may continue to search for random PLMNs to receive an SoR container.

In some embodiments, the UE may store, while in a manual mode of operation, a PLMN identity in an SoR aborted list (e.g., a "PLMNs where registration was aborted due to SoR list"). In such embodiments, in response to storing the PLMN identity in the SoR aborted list, the UE may attempt to obtain service on a higher priority PLMN. In such embodiments, the UE may act (e.g., perform) as if a timer that controls periodic registration attempts has expired and may send a registration complete message to a serving core access and mobility management function (AMF), e.g., such as AMF 704, of the network.

In some embodiments, the UE may fail to replace the prior list of OPLMNs stored on the USIM with the list of OPLMNs included in the SoR container. In such embodiments, the UE may store the list of OPLMNs included in the SoR container in memory and re-attempt storing the list of OPLMNs included in the SoR container on the USIM. In such embodiments, re-attempting to store the list of OPLMNs included in the SoR container on the USIM may occur after expiration of a higher priority PLMN search timer. In some embodiments, the UE may receive a retransmission of the SoR container, determine that contents of the SoR container and contents of the retransmission of the SoR container are the same, and ignore the retransmission of the SoR container.

Figure 13:
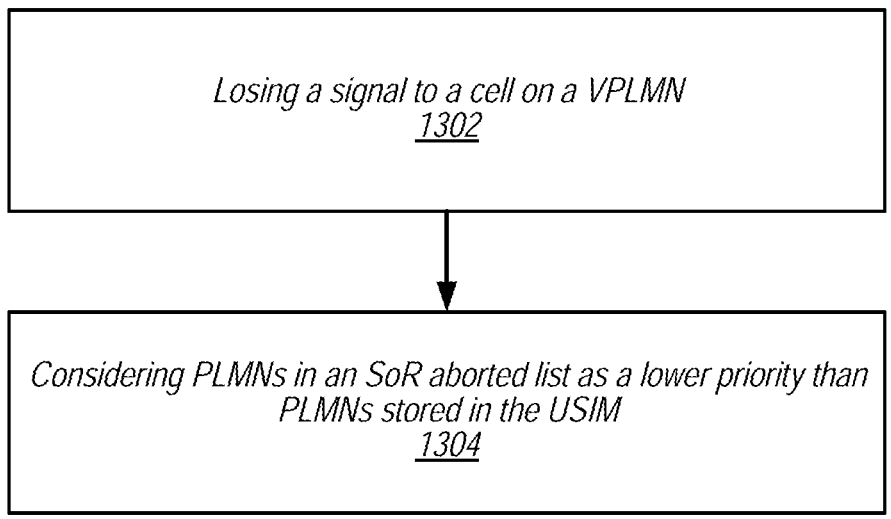
FIG. 13 illustrates a block diagram of an example of a method for managing a search for a PLMN based on an SoR list, according to some embodiments.

As a further example, FIG. 13 illustrates a block diagram of an example of a method for managing a search for a PLMN based on an SoR list, according to some embodiments. The method shown in FIG. 13 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1302, a UE, such as UE 106, may be camping on a cell of a visited PLMN (VPLMN) and may lose a signal to the cell (e.g., the serving cell) on VPLMN.

At 1304, the UE may consider PLMNs in an SoR aborted list as a lower priority than PLMNs stored in the USIM. In some embodiments, the SoR aborted list may be a "PLMNs where registration was aborted due to SoR list."

In some embodiments, the UE may store the prior (and/or current) list of OPLMNs stored on a universal subscriber identity module (USIM) of the UE on a memory of the UE. In other words, the UE may copy a list of OPLMNs (e.g., an SoR list) stored on the USIM to another memory location on the UE. Additionally, the UE may replace the prior (and/or current) list of OPLMNs stored on the USIM with the list of OPLMNs included in the SoR container. In some embodiments, the UE may treat (e.g., consider) the prior list of OPLMNs (e.g., the list of OPLMNs stored in the memory of the UE) as a lower priority list as compared to the list of OPLMNs stored on the USIM. For example, in some embodiments, in response to determining to move from a current public land mobile network (PLMN), the UE may scan (and/or search) for a new PLMN based on the list of OPLMNs stored on the USIM. Additionally, in response to not discovering a PLMN corresponding to an OPLMN in the list of OPLMNs stored on the USIM, the UE may scan (and/or search) for a new PLMN based on the list of OPLMNs stored in the memory of the UE.

In some embodiments, when the OPLMNs within the list of OPLMNs are associated with a plurality of mobile country codes (MCCs), the UE may compare the list of OPLMNs included in the SoR container to the prior list of OPLMNs. Further, the UE may replace OPLMNs in the prior list of OPLMNs that have an MCC corresponding to an MCC of the plurality of MCCs included in the list of OPLMNs. Additionally, the UE may keep OPLMNs in the prior list of OPLMNs that do not have an MCC corresponding to an MCC of the plurality of MCCs included in the list of OPLMNs.

In some embodiments, when the OPLMNs within the list of OPLMNs are associated with a plurality of mobile country codes (MCCs), the UE may compare the list of OPLMNs included in the SoR container to the prior list of OPLMNs (e.g., currently stored on the USIM) and may determine that at least a portion of OPLMNs in the prior list of OPLMNs do not have an MCC corresponding to an MCC of the plurality of MCCs included in the list of OPLMNs, In such embodiments, storing the prior list of OPLMNs stored on the USIM of the UE on the memory of the UE may be based, at least in part, on the determination.

In some embodiments, the UE may perform a high priority PLMN selection in which the UE has PLMNs where registration was aborted due to an SoR list (e.g., a "PLMNs where registration was aborted due to SoR list"). In such embodiments, the UE may consider, during the high priority PLMN selection, equivalent PLMNs (ePLMNs) in a "PLMNs where registration was aborted due to SoR list" as lower priority than ePLMNs associated with an MCC equivalent to an MCC of a current serving vPLMN.

In some embodiments, the UE may add a current PLMN to an SoR aborted list (e.g., a "PLMNs where registration was aborted due to SoR list"). In such embodiments, in response to adding the current PLMN to the SoR aborted list, the UE may not consider ePLMNs as a lowest priority PLMN based, at least in part, on adding the current PLMN to the SoR aborted list.

In some embodiments, the UE may receive the SoR container while in a manual mode of operation and/or while on a user controlled PLMN (UPLMN). In such embodiments, the UE may remain on a current VPLMN.

In some embodiments, the UE may determine that the UE does not have an OPLMN list and/or has an OPLMN list with no matching VPLMNs in a current country (e.g., based on an MCC of the current country). In such embodiments, the UE may continue to search for random PLMNs to receive an SoR container.

In some embodiments, the UE may store, while in a manual mode of operation, a PLMN identity in an SoR aborted list (e.g., a "PLMNs where registration was aborted due to SoR list"). In such embodiments, in response to storing the PLMN identity in the SoR aborted list, the UE may attempt to obtain service on a higher priority PLMN. In such embodiments, the UE may act (e.g., perform) as if a timer that controls periodic registration attempts has expired and may send a registration complete message to a serving core access and mobility management function (AMF), e.g., such as AMF 704, of the network.

In some embodiments, the UE may fail to replace the prior list of OPLMNs stored on the USIM with the list of OPLMNs included in the SoR container. In such embodiments, the UE may store the list of OPLMNs included in the SoR container in memory and re-attempt storing the list of OPLMNs included in the SoR container on the USIM. In such embodiments, re-attempting to store the list of OPLMNs included in the SoR container on the USIM may occur after expiration of a higher priority PLMN search timer. In some embodiments, the UE may receive a retransmission of the SoR container, determine that contents of the SoR container and contents of the retransmission of the SoR container are the same, and ignore the retransmission of the SoR container.

Figure 14:
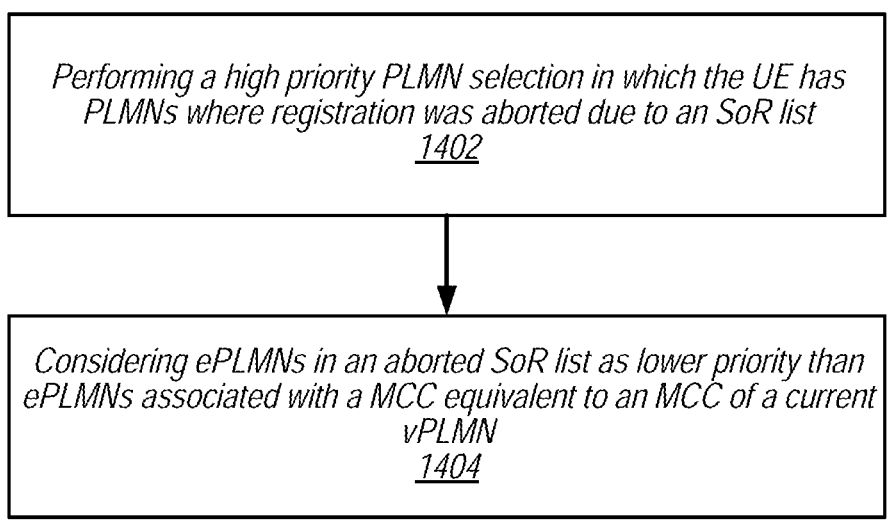
FIG. 14 illustrates a block diagram of another example of a method for managing a search for a PLMN based on an SoR list, according to some embodiments.

As a yet further example, FIG. 14 illustrates a block diagram of another example of a method for managing a search for a PLMN based on an SoR list, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a UE, such as UE 106, may perform a high priority PLMN selection in which the UE has PLMNs where registration was aborted due to an SoR list (e.g., a "PLMNs where registration was aborted due to SoR list").

At 1404, the UE may consider, during the high priority PLMN selection, equivalent PLMNs (ePLMNs) in a "PLMNs where registration was aborted due to SoR list" as lower priority than ePLMNs associated with an MCC equivalent to an MCC of a current serving vPLMN.

In some embodiments, the UE may store the prior (and/or current) list of OPLMNs stored on a universal subscriber identity module (USIM) of the UE on a memory of the UE. In other words, the UE may copy a list of OPLMNs (e.g., an SoR list) stored on the USIM to another memory location on the UE. Additionally, the UE may replace the prior (and/or current) list of OPLMNs stored on the USIM with the list of OPLMNs included in the SoR container. In some embodiments, the UE may treat (e.g., consider) the prior list of OPLMNs (e.g., the list of OPLMNs stored in the memory of the UE) as a lower priority list as compared to the list of OPLMNs stored on the USIM. For example, in some embodiments, in response to determining to move from a current public land mobile network (PLMN), the UE may scan (and/or search) for a new PLMN based on the list of OPLMNs stored on the USIM. Additionally, in response to not discovering a PLMN corresponding to an OPLMN in the list of OPLMNs stored on the USIM, the UE may scan (and/or search) for a new PLMN based on the list of OPLMNs stored in the memory of the UE.

In some embodiments, when the OPLMNs within the list of OPLMNs are associated with a plurality of mobile country codes (MCCs), the UE may compare the list of OPLMNs included in the SoR container to the prior list of OPLMNs. Further, the UE may replace OPLMNs in the prior list of OPLMNs that have an MCC corresponding to an MCC of the plurality of MCCs included in the list of OPLMNs. Additionally, the UE may keep OPLMNs in the prior list of OPLMNs that do not have an MCC corresponding to an MCC of the plurality of MCCs included in the list of OPLMNs.

In some embodiments, when the OPLMNs within the list of OPLMNs are associated with a plurality of mobile country codes (MCCs), the UE may compare the list of OPLMNs included in the SoR container to the prior list of OPLMNs (e.g., currently stored on the USIM) and may determine that at least a portion of OPLMNs in the prior list of OPLMNs do not have an MCC corresponding to an MCC of the plurality of MCCs included in the list of OPLMNs, In such embodiments, storing the prior list of OPLMNs stored on the USIM of the UE on the memory of the UE may be based, at least in part, on the determination.

In some embodiments, the UE may lose a signal to a serving cell on a visited PLMN (VPLMN). In such embodiments, the UE may consider PLMNs in an SoR aborted list as a lower priority than PLMNs stored in the USIM. In some embodiments, the SoR aborted list may be a "PLMNs where registration was aborted due to SoR list."

In some embodiments, the UE may add a current PLMN to an SoR aborted list (e.g., a "PLMNs where registration was aborted due to SoR list"). In such embodiments, in response to adding the current PLMN to the SoR aborted list, the UE may not consider ePLMNs as a lowest priority PLMN based, at least in part, on adding the current PLMN to the SoR aborted list.

In some embodiments, the UE may receive the SoR container while in a manual mode of operation and/or while on a user controlled PLMN (UPLMN). In such embodiments, the UE may remain on a current VPLMN.

In some embodiments, the UE may determine that the UE does not have an OPLMN list and/or has an OPLMN list with no matching VPLMNs in a current country (e.g., based on an MCC of the current country). In such embodiments, the UE may continue to search for random PLMNs to receive an SoR container.

In some embodiments, the UE may store, while in a manual mode of operation, a PLMN identity in an SoR aborted list (e.g., a "PLMNs where registration was aborted due to SoR list"). In such embodiments, in response to storing the PLMN identity in the SoR aborted list, the UE may attempt to obtain service on a higher priority PLMN. In such embodiments, the UE may act (e.g., perform) as if a timer that controls periodic registration attempts has expired and may send a registration complete message to a serving core access and mobility management function (AMF), e.g., such as AMF 704, of the network.

In some embodiments, the UE may fail to replace the prior list of OPLMNs stored on the USIM with the list of OPLMNs included in the SoR container. In such embodiments, the UE may store the list of OPLMNs included in the SoR container in memory and re-attempt storing the list of OPLMNs included in the SoR container on the USIM. In such embodiments, re-attempting to store the list of OPLMNs included in the SoR container on the USIM may occur after expiration of a higher priority PLMN search timer. In some embodiments, the UE may receive a retransmission of the SoR container, determine that contents of the SoR container and contents of the retransmission of the SoR container are the same, and ignore the retransmission of the SoR container.

Figure 15:
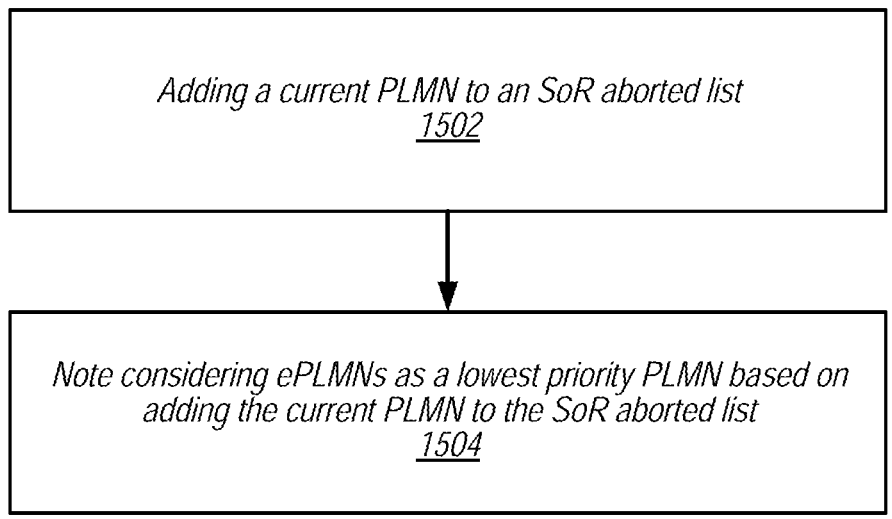
FIG. 15 illustrates a block diagram of a further example of a method for managing a search for a PLMN based on an SoR list, according to some embodiments.

As another example, FIG. 15 illustrates a block diagram of a further example of a method for managing a search for a PLMN based on an SoR list, according to some embodiments. The method shown in FIG. 15 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1502, a UE, such as UE 106, may add a current PLMN to an SoR aborted list (e.g., a "PLMNs where registration was aborted due to SoR list").

At 1504, in response to adding the current PLMN to the SoR aborted list, the UE may not consider ePLMNs as a lowest priority PLMN based, at least in part, on adding the current PLMN to the SoR aborted list.

In some embodiments, the UE may store the prior (and/or current) list of OPLMNs stored on a universal subscriber identity module (USIM) of the UE on a memory of the UE. In other words, the UE may copy a list of OPLMNs (e.g., an SoR list) stored on the USIM to another memory location on the UE. Additionally, the UE may replace the prior (and/or current) list of OPLMNs stored on the USIM with the list of OPLMNs included in the SoR container. In some embodiments, the UE may treat (e.g., consider) the prior list of OPLMNs (e.g., the list of OPLMNs stored in the memory of the UE) as a lower priority list as compared to the list of OPLMNs stored on the USIM. For example, in some embodiments, in response to determining to move from a current public land mobile network (PLMN), the UE may scan (and/or search) for a new PLMN based on the list of OPLMNs stored on the USIM. Additionally, in response to not discovering a PLMN corresponding to an OPLMN in the list of OPLMNs stored on the USIM, the UE may scan (and/or search) for a new PLMN based on the list of OPLMNs stored in the memory of the UE.

In some embodiments, when the OPLMNs within the list of OPLMNs are associated with a plurality of mobile country codes (MCCs), the UE may compare the list of OPLMNs included in the SoR container to the prior list of OPLMNs. Further, the UE may replace OPLMNs in the prior list of OPLMNs that have an MCC corresponding to an MCC of the plurality of MCCs included in the list of OPLMNs. Additionally, the UE may keep OPLMNs in the prior list of OPLMNs that do not have an MCC corresponding to an MCC of the plurality of MCCs included in the list of OPLMNs.

In some embodiments, when the OPLMNs within the list of OPLMNs are associated with a plurality of mobile country codes (MCCs), the UE may compare the list of OPLMNs included in the SoR container to the prior list of OPLMNs (e.g., currently stored on the USIM) and may determine that at least a portion of OPLMNs in the prior list of OPLMNs do not have an MCC corresponding to an MCC of the plurality of MCCs included in the list of OPLMNs. In such embodiments, storing the prior list of OPLMNs stored on the USIM of the UE on the memory of the UE may be based, at least in part, on the determination.

In some embodiments, the UE may lose a signal to a serving cell on a visited PLMN (VPLMN). In such embodiments, the UE may consider PLMNs in an SoR aborted list as a lower priority than PLMNs stored in the USIM. In some embodiments, the SoR aborted list may be a "PLMNs where registration was aborted due to SoR list."

In some embodiments, the UE may perform a high priority PLMN selection in which the UE has PLMNs where registration was aborted due to an SoR list (e.g., a "PLMNs where registration was aborted due to SoR list"). In such embodiments, the UE may consider, during the high priority PLMN selection, equivalent PLMNs (ePLMNs) in a "PLMNs where registration was aborted due to SoR list" as lower priority than ePLMNs associated with an MCC equivalent to an MCC of a current serving vPLMN.

In some embodiments, the UE may receive the SoR container while in a manual mode of operation and/or while on a user controlled PLMN (UPLMN). In such embodiments, the UE may remain on a current VPLMN.

In some embodiments, the UE may determine that the UE does not have an OPLMN list and/or has an OPLMN list with no matching VPLMNs in a current country (e.g., based on an MCC of the current country). In such embodiments, the UE may continue to search for random PLMNs to receive an SoR container.

In some embodiments, the UE may store, while in a manual mode of operation, a PLMN identity in an SoR aborted list (e.g., a "PLMNs where registration was aborted due to SoR list"). In such embodiments, in response to storing the PLMN identity in the SoR aborted list, the UE may attempt to obtain service on a higher priority PLMN. In such embodiments, the UE may act (e.g., perform) as if a timer that controls periodic registration attempts has expired and may send a registration complete message to a serving core access and mobility management function (AMF), e.g., such as AMF 704, of the network.

In some embodiments, the UE may fail to replace the prior list of OPLMNs stored on the USIM with the list of OPLMNs included in the SoR container. In such embodiments, the UE may store the list of OPLMNs included in the SoR container in memory and re-attempt storing the list of OPLMNs included in the SoR container on the USIM. In such embodiments, re-attempting to store the list of OPLMNs included in the SoR container on the USIM may occur after expiration of a higher priority PLMN search timer. In some embodiments, the UE may receive a retransmission of the SoR container, determine that contents of the SoR container and contents of the retransmission of the SoR container are the same, and ignore the retransmission of the SoR container.

Figure 16:
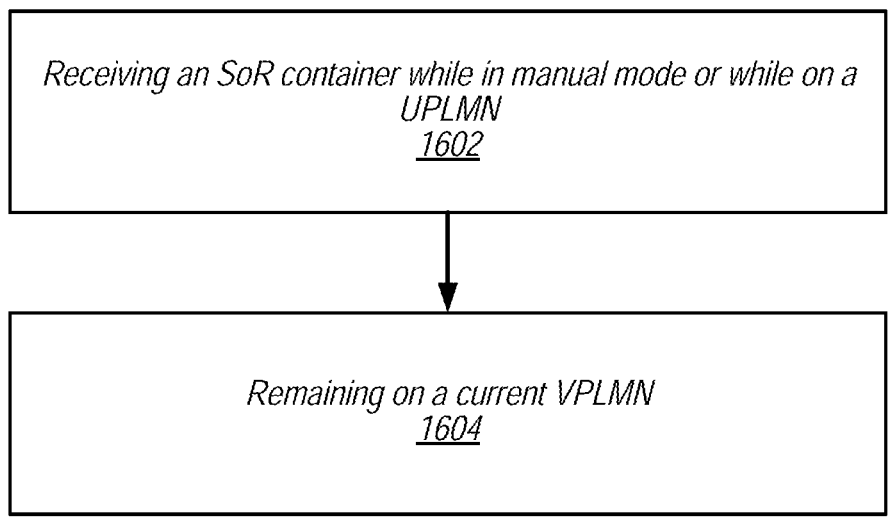
FIG. 16 illustrates a block diagram of an example of a method for managing selection of a PLMN based on an SoR list, according to some embodiments.

As an example, FIG. 16 illustrates a block diagram of an example of a method for managing selection of a PLMN based on an SoR list, according to some embodiments. The method shown in FIG. 16 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1602, a UE, such as UE 106, may receive the SoR container while in a manual mode of operation and/or while on a user controlled PLMN (UPLMN). In some embodiments the SoR container may be a secured packet.

At 1604, the UE may remain on a current VPLMN.

In some embodiments, the UE may store the prior (and/or current) list of OPLMNs stored on a universal subscriber identity module (USIM) of the UE on a memory of the UE. In other words, the UE may copy a list of OPLMNs (e.g., an SoR list) stored on the USIM to another memory location on the UE. Additionally, the UE may replace the prior (and/or current) list of OPLMNs stored on the USIM with the list of OPLMNs included in the SoR container. In some embodiments, the UE may treat (e.g., consider) the prior list of OPLMNs (e.g., the list of OPLMNs stored in the memory of the UE) as a lower priority list as compared to the list of OPLMNs stored on the USIM. For example, in some embodiments, in response to determining to move from a current public land mobile network (PLMN), the UE may scan (and/or search) for a new PLMN based on the list of OPLMNs stored on the USIM. Additionally, in response to not discovering a PLMN corresponding to an OPLMN in the list of OPLMNs stored on the USIM, the UE may scan (and/or search) for a new PLMN based on the list of OPLMNs stored in the memory of the UE.

In some embodiments, when the OPLMNs within the list of OPLMNs are associated with a plurality of mobile country codes (MCCs), the UE may compare the list of OPLMNs included in the SoR container to the prior list of OPLMNs. Further, the UE may replace OPLMNs in the prior list of OPLMNs that have an MCC corresponding to an MCC of the plurality of MCCs included in the list of OPLMNs. Additionally, the UE may keep OPLMNs in the prior list of OPLMNs that do not have an MCC corresponding to an MCC of the plurality of MCCs included in the list of OPLMNs.

In some embodiments, when the OPLMNs within the list of OPLMNs are associated with a plurality of mobile country codes (MCCs), the UE may compare the list of OPLMNs included in the SoR container to the prior list of OPLMNs (e.g., currently stored on the USIM) and may determine that at least a portion of OPLMNs in the prior list of OPLMNs do not have an MCC corresponding to an MCC of the plurality of MCCs included in the list of OPLMNs, In such embodiments, storing the prior list of OPLMNs stored on the USIM of the UE on the memory of the UE may be based, at least in part, on the determination.

In some embodiments, the UE may lose a signal to a serving cell on a visited PLMN (VPLMN). In such embodiments, the UE may consider PLMNs in an SoR aborted list as a lower priority than PLMNs stored in the USIM. In some embodiments, the SoR aborted list may be a "PLMNs where registration was aborted due to SoR list."

In some embodiments, the UE may perform a high priority PLMN selection in which the UE has PLMNs where registration was aborted due to an SoR list (e.g., a "PLMNs where registration was aborted due to SoR list"). In such embodiments, the UE may consider, during the high priority PLMN selection, equivalent PLMNs (ePLMNs) in a "PLMNs where registration was aborted due to SoR list" as lower priority than ePLMNs associated with an MCC equivalent to an MCC of a current serving vPLMN.

In some embodiments, the UE may add a current PLMN to an SoR aborted list (e.g., a "PLMNs where registration was aborted due to SoR list"). In such embodiments, in response to adding the current PLMN to the SoR aborted list, the UE may not consider ePLMNs as a lowest priority PLMN based, at least in part, on adding the current PLMN to the SoR aborted list.

In some embodiments, the UE may determine that the UE does not have an OPLMN list and/or has an OPLMN list with no matching VPLMNs in a current country (e.g., based on an MCC of the current country). In such embodiments, the UE may continue to search for random PLMNs to receive an SoR container.

In some embodiments, the UE may store, while in a manual mode of operation, a PLMN identity in an SoR aborted list (e.g., a "PLMNs where registration was aborted due to SoR list"). In such embodiments, in response to storing the PLMN identity in the SoR aborted list, the UE may attempt to obtain service on a higher priority PLMN. In such embodiments, the UE may act (e.g., perform) as if a timer that controls periodic registration attempts has expired and may send a registration complete message to a serving core access and mobility management function (AMF), e.g., such as AMF 704, of the network.

In some embodiments, the UE may fail to replace the prior list of OPLMNs stored on the USIM with the list of OPLMNs included in the SoR container. In such embodiments, the UE may store the list of OPLMNs included in the SoR container in memory and re-attempt storing the list of OPLMNs included in the SoR container on the USIM. In such embodiments, re-attempting to store the list of OPLMNs included in the SoR container on the USIM may occur after expiration of a higher priority PLMN search timer. In some embodiments, the UE may receive a retransmission of the SoR container, determine that contents of the SoR container and contents of the retransmission of the SoR container are the same, and ignore the retransmission of the SoR container.

Figure 17:
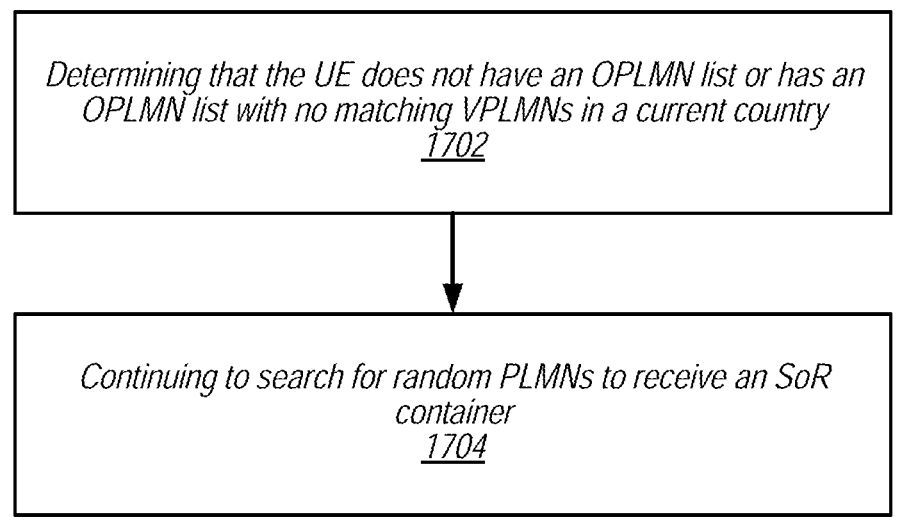
FIG. 17 illustrates a block diagram of an example of a method for managing a search for a PLMN based on an SoR list, according to some embodiments.

As another example, FIG. 17 illustrates a block diagram of an example of a method for managing a search for a PLMN based on an SoR list, according to some embodiments. The method shown in FIG. 17 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1702, a UE, such as UE 106, may determine that the UE does not have an OPLMN list and/or has an OPLMN list with no matching VPLMNs in a current country (e.g., based on an MCC of the current country).

At 1704, in response to determining that the UE does not have an OPLMN list and/or has an OPLMN list with no matching VPLMNs in a current country, the UE may continue to search for random PLMNs to receive an SoR container.

In some embodiments, the UE may store the prior (and/or current) list of OPLMNs stored on a universal subscriber identity module (USIM) of the UE on a memory of the UE. In other words, the UE may copy a list of OPLMNs (e.g., an SoR list) stored on the USIM to another memory location on the UE. Additionally, the UE may replace the prior (and/or current) list of OPLMNs stored on the USIM with the list of OPLMNs included in the SoR container. In some embodiments, the UE may treat (e.g., consider) the prior list of OPLMNs (e.g., the list of OPLMNs stored in the memory of the UE) as a lower priority list as compared to the list of OPLMNs stored on the USIM. For example, in some embodiments, in response to determining to move from a current public land mobile network (PLMN), the UE may scan (and/or search) for a new PLMN based on the list of OPLMNs stored on the USIM. Additionally, in response to not discovering a PLMN corresponding to an OPLMN in the list of OPLMNs stored on the USIM, the UE may scan (and/or search) for a new PLMN based on the list of OPLMNs stored in the memory of the UE.

In some embodiments, when the OPLMNs within the list of OPLMNs are associated with a plurality of mobile country codes (MCCs), the UE may compare the list of OPLMNs included in the SoR container to the prior list of OPLMNs. Further, the UE may replace OPLMNs in the prior list of OPLMNs that have an MCC corresponding to an MCC of the plurality of MCCs included in the list of OPLMNs. Additionally, the UE may keep OPLMNs in the prior list of OPLMNs that do not have an MCC corresponding to an MCC of the plurality of MCCs included in the list of OPLMNs.

In some embodiments, when the OPLMNs within the list of OPLMNs are associated with a plurality of mobile country codes (MCCs), the UE may compare the list of OPLMNs included in the SoR container to the prior list of OPLMNs (e.g., currently stored on the USIM) and may determine that at least a portion of OPLMNs in the prior list of OPLMNs do not have an MCC corresponding to an MCC of the plurality of MCCs included in the list of OPLMNs, In such embodiments, storing the prior list of OPLMNs stored on the USIM of the UE on the memory of the UE may be based, at least in part, on the determination.

In some embodiments, the UE may lose a signal to a serving cell on a visited PLMN (VPLMN). In such embodiments, the UE may consider PLMNs in an SoR aborted list as a lower priority than PLMNs stored in the USIM. In some embodiments, the SoR aborted list may be a "PLMNs where registration was aborted due to SoR list."

In some embodiments, the UE may perform a high priority PLMN selection in which the UE has PLMNs where registration was aborted due to an SoR list (e.g., a "PLMNs where registration was aborted due to SoR list"). In such embodiments, the UE may consider, during the high priority PLMN selection, equivalent PLMNs (ePLMNs) in a "PLMNs where registration was aborted due to SoR list" as lower priority than ePLMNs associated with an MCC equivalent to an MCC of a current serving vPLMN.

In some embodiments, the UE may add a current PLMN to an SoR aborted list (e.g., a "PLMNs where registration was aborted due to SoR list"). In such embodiments, in response to adding the current PLMN to the SoR aborted list, the UE may not consider ePLMNs as a lowest priority PLMN based, at least in part, on adding the current PLMN to the SoR aborted list.

In some embodiments, the UE may receive the SoR container while in a manual mode of operation and/or while on a user controlled PLMN (UPLMN). In such embodiments, the UE may remain on a current VPLMN.

In some embodiments, the UE may store, while in a manual mode of operation, a PLMN identity in an SoR aborted list (e.g., a "PLMNs where registration was aborted due to SoR list"). In such embodiments, in response to storing the PLMN identity in the SoR aborted list, the UE may attempt to obtain service on a higher priority PLMN. In such embodiments, the UE may act (e.g., perform) as if a timer that controls periodic registration attempts has expired and may send a registration complete message to a serving core access and mobility management function (AMF), e.g., such as AMF 704, of the network.

In some embodiments, the UE may fail to replace the prior list of OPLMNs stored on the USIM with the list of OPLMNs included in the SoR container. In such embodiments, the UE may store the list of OPLMNs included in the SoR container in memory and re-attempt storing the list of OPLMNs included in the SoR container on the USIM. In such embodiments, re-attempting to store the list of OPLMNs included in the SoR container on the USIM may occur after expiration of a higher priority PLMN search timer. In some embodiments, the UE may receive a retransmission of the SoR container, determine that contents of the SoR container and contents of the retransmission of the SoR container are the same, and ignore the retransmission of the SoR container.

Figure 18:
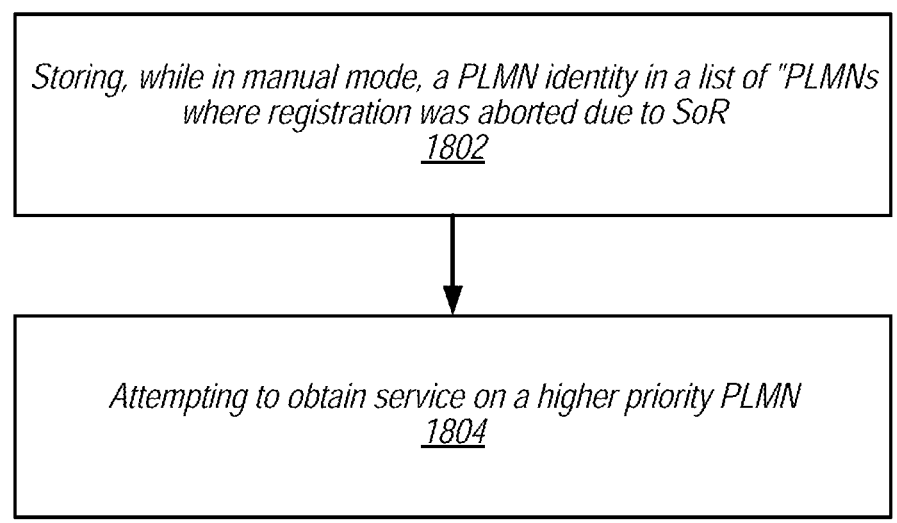
FIG. 18 illustrates a block diagram of an example of a method for managing a selection of a PLMN based on an SoR list, according to some embodiments.

As a yet further example, FIG. 18 illustrates a block diagram of an example of a method for managing a selection of a PLMN based on an SoR list, according to some embodiments. The method shown in FIG. 18 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1802, a UE, such as UE 106, UE may store, while in a manual mode of operation, a PLMN identity in an SoR aborted list (e.g., a "PLMNs where registration was aborted due to SoR list").

At 1804, in response to storing the PLMN identity in the SoR aborted list, the UE may attempt to obtain service on a higher priority PLMN. In such embodiments, the UE may act (e.g., perform) as if a timer that controls periodic registration attempts has expired and may send a registration complete message to a serving core access and mobility management function (AMF), e.g., such as AMF 704, of the network.

In some embodiments, the UE may store the prior (and/or current) list of OPLMNs stored on a universal subscriber identity module (USIM) of the UE on a memory of the UE. In other words, the UE may copy a list of OPLMNs (e.g., an SoR list) stored on the USIM to another memory location on the UE. Additionally, the UE may replace the prior (and/or current) list of OPLMNs stored on the USIM with the list of OPLMNs included in the SoR container. In some embodiments, the UE may treat (e.g., consider) the prior list of OPLMNs (e.g., the list of OPLMNs stored in the memory of the UE) as a lower priority list as compared to the list of OPLMNs stored on the USIM. For example, in some embodiments, in response to determining to move from a current public land mobile network (PLMN), the UE may scan (and/or search) for a new PLMN based on the list of OPLMNs stored on the USIM. Additionally, in response to not discovering a PLMN corresponding to an OPLMN in the list of OPLMNs stored on the USIM, the UE may scan (and/or search) for a new PLMN based on the list of OPLMNs stored in the memory of the UE.

In some embodiments, when the OPLMNs within the list of OPLMNs are associated with a plurality of mobile country codes (MCCs), the UE may compare the list of OPLMNs included in the SoR container to the prior list of OPLMNs. Further, the UE may replace OPLMNs in the prior list of OPLMNs that have an MCC corresponding to an MCC of the plurality of MCCs included in the list of OPLMNs. Additionally, the UE may keep OPLMNs in the prior list of OPLMNs that do not have an MCC corresponding to an MCC of the plurality of MCCs included in the list of OPLMNs.

In some embodiments, when the OPLMNs within the list of OPLMNs are associated with a plurality of mobile country codes (MCCs), the UE may compare the list of OPLMNs included in the SoR container to the prior list of OPLMNs (e.g., currently stored on the USIM) and may determine that at least a portion of OPLMNs in the prior list of OPLMNs do not have an MCC corresponding to an MCC of the plurality of MCCs included in the list of OPLMNs, In such embodiments, storing the prior list of OPLMNs stored on the USIM of the UE on the memory of the UE may be based, at least in part, on the determination.

In some embodiments, the UE may lose a signal to a serving cell on a visited PLMN (VPLMN). In such embodiments, the UE may consider PLMNs in an SoR aborted list as a lower priority than PLMNs stored in the USIM. In some embodiments, the SoR aborted list may be a "PLMNs where registration was aborted due to SoR list."

In some embodiments, the UE may perform a high priority PLMN selection in which the UE has PLMNs where registration was aborted due to an SoR list (e.g., a "PLMNs where registration was aborted due to SoR list"). In such embodiments, the UE may consider, during the high priority PLMN selection, equivalent PLMNs (ePLMNs) in a "PLMNs where registration was aborted due to SoR list" as lower priority than ePLMNs associated with an MCC equivalent to an MCC of a current serving vPLMN.

In some embodiments, the UE may add a current PLMN to an SoR aborted list (e.g., a "PLMNs where registration was aborted due to SoR list"). In such embodiments, in response to adding the current PLMN to the SoR aborted list, the UE may not consider ePLMNs as a lowest priority PLMN based, at least in part, on adding the current PLMN to the SoR aborted list.

In some embodiments, the UE may receive the SoR container while in a manual mode of operation and/or while on a user controlled PLMN (UPLMN). In such embodiments, the UE may remain on a current VPLMN.

In some embodiments, the UE may determine that the UE does not have an OPLMN list and/or has an OPLMN list with no matching VPLMNs in a current country (e.g., based on an MCC of the current country). In such embodiments, the UE may continue to search for random PLMNs to receive an SoR container.

In some embodiments, the UE may fail to replace the prior list of OPLMNs stored on the USIM with the list of OPLMNs included in the SoR container. In such embodiments, the UE may store the list of OPLMNs included in the SoR container in memory and re-attempt storing the list of OPLMNs included in the SoR container on the USIM. In such embodiments, re-attempting to store the list of OPLMNs included in the SoR container on the USIM may occur after expiration of a higher priority PLMN search timer. In some embodiments, the UE may receive a retransmission of the SoR container, determine that contents of the SoR container and contents of the retransmission of the SoR container are the same, and ignore the retransmission of the SoR container.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   a memory; and
   a processor in communication with the memory, wherein the processor is configured to:
   receive, from a network, a steering of roaming (SoR) container, wherein the SoR container includes a list of operator preferred public land mobile network (OPLMNs);
   store a prior list of OPLMNs stored on a universal subscriber identity module (USIM) on the memory;
   replace the prior list of OPLMNs stored on the USIM with the list of OPLMNs included in the SoR container; and
   treat, in response to losing a signal to a cell on a visited PLMN (VPLMN), PLMNs in an SoR aborted list as a lower priority than PLMNs stored on the USIM.

2. The apparatus of claim 1,
   wherein the prior list of OPLMNs stored on the memory is treated as a lower priority list as compared to the list of OPLMNs stored on the USIM.

3. The apparatus of claim 1,
wherein the processor is further configured to:
- in response to determining to move from a current public land mobile network (PLMN), scan for a new PLMN based on the list of OPLMNs stored on the USIM; and
- in response to not discovering a PLMN corresponding to an OPLMN in the OPLMNs stored on the USIM, scan for a new PLMN based on the list of OPLMNs stored in the memory.

4. The apparatus of claim 1,
wherein the SoR container is a secured packet.

5. The apparatus of claim 1,
wherein the OPLMNs within the list are associated with a plurality of mobile country codes (MCCs).

6. The apparatus of claim 5,
wherein the processor is further configured to:
- compare the list of OPLMNs included in the SoR container to the prior list of OPLMNs; and
- replace OPLMNs in the prior list of OPLMNs that have an MCC corresponding to an MCC of the plurality of MCCs included in the list of OPLMNs.

7. The apparatus of claim 6,
wherein the processor is further configured to:
- keep OPLMNs in the prior list of OPLMNs that do not have an MCC corresponding to an MCC of the plurality of MCCs included in the list of OPLMNs.

8. The apparatus of claim 5,
wherein the processor is further configured to:
- compare the list of OPLMNs included in the SoR container to the prior list of OPLMNs; and
- determine that at least a portion of OPLMNs in the prior list of OPLMNs do not have an MCC corresponding to an MCC of the plurality of MCCs included in the list of OPLMNs, wherein storing the prior list of OPLMNs stored on the USIM on the memory is based, at least in part, on the determination.

9. A user equipment device (UE), comprising:
at least one antenna;
at least one radio, wherein the at least one radio is configured to perform cellular communication using at least one radio access technology (RAT); and
one or more processors coupled to the at least one radio, wherein the one or more processors and the at least one radio are configured to perform voice and/or data communications;
wherein the one or more processors are configured to cause the UE to:
- receive, from a network, a steering of roaming (SoR) container, wherein the SoR container includes a list of operator preferred public land mobile networks (OPLMNs), and wherein the OPLMNs within the list are associated with a plurality of mobile country codes (MCCs);
- compare the list of OPLMNs included in the SoR container to a prior list of OPLMNs;
- replace OPLMNs in the prior list of OPLMNs that have an MCC corresponding to an MCC of the plurality of MCCs included in the list of OPLMNs; and
- treat, in response to losing a signal to a cell on a visited PLMN (VPLMN), PLMNs in an SoR aborted list as a lower priority than PLMNs stored in a universal subscriber identity module (USIM) of the UE on a memory of the UE.

10. The UE of claim 9,
wherein the one or more processors are configured to cause the UE to:
- keep OPLMNs in the prior list of OPLMNs that do not have an MCC corresponding to an MCC of the plurality of MCCs included in the list of OPLMNs.

11. The UE of claim 9,
wherein the one or more processors are configured to cause the UE to:
- store, based, at least in part, on determining that at least a portion of OPLMNs in the prior list of OPLMNs do not have an MCC corresponding to an MCC of the plurality of MCCs included in the list of OPLMNs, the prior list of OPLMNs stored on the USIM of the UE.

12. The UE of claim 9,
wherein the one or more processors are configured to cause the UE to:
- perform a high priority PLMN selection in which the UE has PLMNs where registration was aborted due to an SoR list; and
- treat, during the high priority PLMN selection, equivalent PLMNs in a "PLMNs where registration was aborted due to SoR list" as lower priority than equivalent PLMNs associated with a mobile country code (MCC) equivalent to a MCC of a current serving visited PLMN.

13. The UE of claim 9,
wherein the one or more processors are configured to cause the UE to:
- add a current PLMN to an SoR aborted list, wherein the SoR aborted list comprises a "registration was aborted due to SoR list"; and
- not treat equivalent PLMNs as a lowest priority PLMN based on adding the current PLMN to the SoR aborted list.

14. The UE of claim 9,
wherein the one or more processors are configured to cause the UE to:
- receive an SoR container while in manual mode or while on a user controlled PLMN; and
- remain on a current VPLMN.

15. The UE of claim 9,
wherein the one or more processors are configured to cause the UE to:
- determine that the UE does not have an OPLMN list or has an OPLMN list with no matching VPLMNs in a current country; and
- continue to search for random PLMNs to receive an SoR container.

16. The UE of claim 9,
wherein the prior list of OPLMNs is treated as a lower priority list as compared to a list of OPLMNs stored on the USIM.

17. A non-transitory computer readable memory medium storing program instructions executable by processing circuitry to cause a user equipment device (UE) to:
- store, while in manual mode of operation, a public land mobile network (PLMN) identity in a steering of roaming (SoR) aborted list;
- attempt to obtain service on a higher priority PLMN; and
- treat, in response to losing a signal to a cell on a visited PLMN (VPLMN), PLMNs in an SoR aborted list as a lower priority than PLMNs stored in a universal subscriber identity module (USIM) of the UE on a memory of the UE.

18. The non-transitory computer readable memory medium of claim 17,
   wherein the SoR aborted list includes a "PLMNs where registration was aborted due to SoR list".

19. The non-transitory computer readable memory medium of claim 17,
   wherein the program instructions are further executable to:
      perform as if a timer that controls periodic attempts has expired; and
      send a registration complete message to a serving a core access and mobility management function (AMF).

20. The non-transitory computer readable memory medium of claim 17,
   wherein the program instructions are further executable to:
      fail to replace the prior list of OPLMNs stored on the USIM with the list of OPLMNs included in an SOR container;
      store the list of OPLMNs included in the SoR container in memory;
      re-attempt to store the list of OPLMNs included in the SoR container on the USIM, wherein the reattempting occurs after expiration of a higher priority PLMN search timer;
      receive a retransmission of the SoR container;
      determine that contents of the SoR container and contents of the retransmission of the SoR container are the same; and
      ignore the retransmission of the SoR container.

\* \* \* \* \*